(12) United States Patent  (10) Patent No.: US 8,819,058 B2
Lerman et al.  (45) Date of Patent: Aug. 26, 2014

(54) METHOD AND SYSTEM FOR PROVIDING ENHANCED BUSINESS LISTINGS TO MULTIPLE SEARCH PROVIDERS FROM A SINGLE SOURCE

(75) Inventors: Howard C. Lerman, New York, NY (US); Jonathan David Kennell, New York, NY (US); Thomas C. Dixon, New York, NY (US)

(73) Assignee: Yext, Inc., New York, NY (US)

( * ) Notice: Subject to any disclaimer, the term of this patent is extended or adjusted under 35 U.S.C. 154(b) by 227 days.

(21) Appl. No.: 13/342,540

(22) Filed: Jan. 3, 2012

(65) Prior Publication Data

US 2013/0173654 A1   Jul. 4, 2013

(51) Int. Cl.
*G06F 17/30*   (2006.01)

(52) U.S. Cl.
USPC ............... 707/769; 707/705; 707/E17.014

(58) Field of Classification Search
CPC .......... G06F 17/30879; G06F 17/3089; G06F 3/03545; G06F 17/3087; G06F 17/30867; G06F 17/30893; G06F 17/3012; G06F 17/30377; G06F 17/30424; G06F 17/30864; G06F 11/2094; G06F 17/245; G06F 17/30241
USPC ........................................................ 707/769
See application file for complete search history.

(56) References Cited

U.S. PATENT DOCUMENTS

| | | | |
|---|---|---|---|
| 2006/0136595 A1* | 6/2006 | Satyavolu | 709/229 |
| 2008/0005342 A1* | 1/2008 | Schneider | 709/230 |
| 2010/0005025 A1* | 1/2010 | Kumar et al. | 705/40 |
| 2011/0202343 A1* | 8/2011 | Brown et al. | 704/256.1 |

* cited by examiner

*Primary Examiner* — Shyue Jiunn Hwa
(74) *Attorney, Agent, or Firm* — Lowenstein Sander LLP

(57) ABSTRACT

Methods and systems for providing enhanced listings of an entity to multiple search service provider systems from a single source system are disclosed. The single source system transmits listing identification data related to the entity to at least one provider system. The single source system receives a listing from the at least one provider system. The listing is configured to include a provider-supplied external ID. The single source system delivers an enhanced listing to the at least one provider system based on the presence or absence of the provider-supplied external ID.

21 Claims, 25 Drawing Sheets

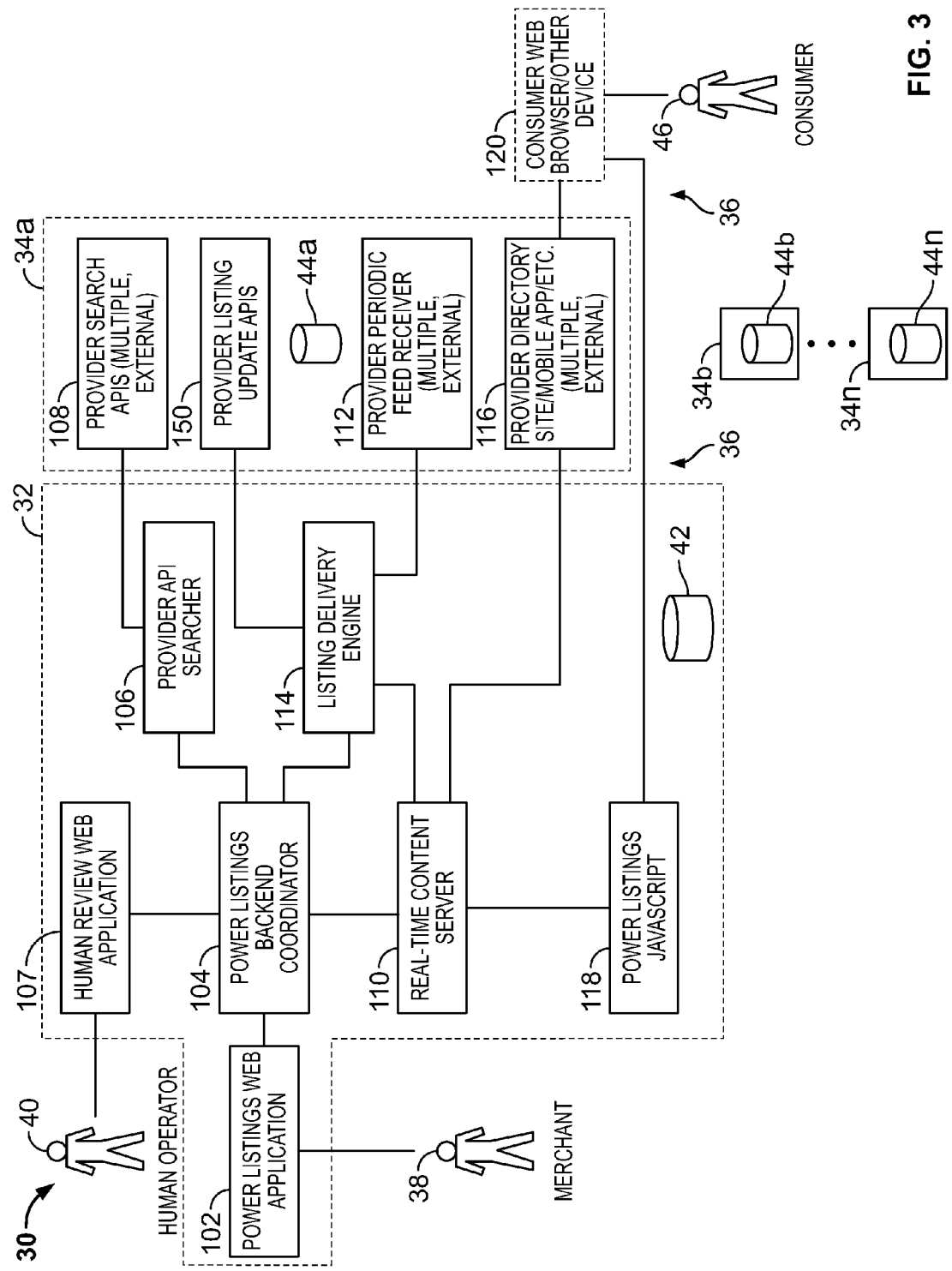

900 ⤴

Exemplary List of All of the Listings that Should have a Promotional Highlight (as Created for a Provider in)

```xml
<?xml version="1.0" encoding="UTF-8"?>
<listings>
  <listing>
    <locationId>113244</locationId>          ← 902
    <externalId>264917653</externalId>       ← 904
    <tag>Free 7-Day Trial</tag>
    <name>Onelife Fitness</name>             ← 906
    <untrackedPhone>
      <countryCode>1</countryCode>
      <number>7575991888</number>
    </untrackedPhone>
    <address>
      <street>815 Middle Ground Blvd</street>
      <city>Newport News</city>
      <state>VA</state>
      <postalCode>23606</postalCode>
    </address>
    <geoTarget>
      <latitude>37.094926</latitude>
      <longitude>-76.471551</longitude>
      <visibilityRadius>1.0</visibilityRadius>
    </geoTarget>
    <hours>
    </hours>
    <categories>
      <category id="805102">Health Care Facilities</category>
      <category id="809907">Health Services</category>
      <category id="809921">Wellness Programs</category>
      <category id="809999">Health & Allied Services</category>
    </categories>
    <bios>
    </bios>
    <images>
    </images>
    <testimonials>
    </testimonials>
  </listing>
```

FIG. 9A

```
<listing>                                                              ⎯908
    <locationId>113245</locationId>
    <externalId>266147109</externalId>
    <tag>Free 7-Day Trial</tag>
    <name>Onelife Fitness</name>
    <untrackedPhone>
       <countryCode>1</countryCode>
       <number>7575995433</number>
    </untrackedPhone>
    <address>
       <street>11805 Fountain Way</street>
       <city>Newport News</city>
       <state>VA</state>
       <postalCode>23606</postalCode>
    </address>
    <geoTarget>
       <latitude>37.08551</latitude>
       <longitude>-76.473097</longitude>
       <visibilityRadius>1.0</visibilityRadius>
    </geoTarget>
    <hours>
    </hours>
    <categories>
       <category id="805102">Health Care Facilities</category>
       <category id="809907">Health Services</category>
       <category id="809921">Wellness Programs</category>
       <category id="809999">Health & Allied Services</category>
    </categories>
    <bios>
    </bios>
    <images>
    </images>
    <testimonials>
    </testimonials>
</listing>                                                             ⎯910
```

FIG. 9B

Exemplary Receipt File Containing the Listings of Fig. 9A + 9B

```
"provider_id_to_yext_id_receipt" : [
    {
        "yext_id" : 131528,
        "provider_id" : "AJUDPj6"
        URL1
    },
    {
        "yext_id" : 137013,
        "provider_id" : "AJUDxsJ"
        URL2
    },
    {
        "yext_id" : 132057,
        "provider_id" : "AJUD57z"
        URL3
    },
    {
        "yext_id" : 130610,
        "provider_id" : "AJUEX_q"
        URL4
    },
    {
        "yext_id" : 117762,
        "provider_id" : "AJUEjh0"
        URL5
    }
    ...
}
```

1000, 1002, 1004 (provider_id), 1006 (yext_id)

FIG. 10

Example of a Rendered Web Page Containing a Non-consumer Visible List of All Listings that Should Receive a Promotional Message, Indicated as a Comma-separated List of Location IDs or External IDs

```
<html>
...

<div class="search-result">
Awesome Physical Therapist<br>
<span id="yext_80748"></span>
</div>

<div class="search-result">
Great Physical Therapist<br>
<span id="yext_232111"></span>
</div>

...

<script>
// Standard script to include to load data from Yext via JSONP.
(function () {
   var el = document.createElement('script');
   el.async = true;
   el.src = 'http://s.yext-listings.com/tagsjs' +
'?pid=123' +
'&pagetype=serp' +
'&ids=80748, 232111';
   (document.getElementsByTagName('head') [0] ||
 document.getElementsByTagName('body') [0]).appendChild(el);
} )();
</script>

...

</html>
```

FIG. 18

METHOD AND SYSTEM FOR PROVIDING
ENHANCED BUSINESS LISTINGS TO
MULTIPLE SEARCH PROVIDERS FROM A
SINGLE SOURCE

FIELD OF THE INVENTION

The present invention relates generally to Internet search methods, and more particularly, to a method and system for providing enhanced business listings to multiple search service providers from a single source system in an integrated fashion.

BACKGROUND OF THE INVENTION

A consumer and/or merchant may rely heavily on services rendered via the Internet. One such service is searchable listings provided by a search service (also known in some instances as "yellow pages" or "Internet yellow pages," e.g., Google.com, Amazon.com, Yahoo.com, Yelp.com, MapQuest.com, Superpages.com, etc.). Searchable listings may include businesses, such as restaurants, people information, product information, etc. The information provided may include, for example, a name of a person or business, addresses, telephone numbers (i.e., a network access point (NAP)). The information provided may also include web site URLs, photos, videos e-mail addresses, etc., as well as a special tagline to be used for promotional purposes, the latter included in a visual "tag" highlight (together, "enhanced content"). The consumer may be presented with other information about a business by either clicking anywhere in the listing, including the tagline, or placing a mouse pointer or finger over the listing, including the tagline.

Certain search service providers, such as Google.com, WhitePages.com, MapQuest.com, provide some or all of the requested information in alphabetical, "most visited", or distance order (i.e., distance from a location that the consumer entered for a search or a distance from a location of the search provider). A merchant may wish to ensure that the NAP information provided in the search results is correct, so that a consumer may find a listing when searching in her local area, and if the consumer does choose to call or visit the merchant's business, the consumer is provided with correct information. Furthermore, a merchant may desire to maximize the chance that a consumer will select the merchant's listing from among those returned. The listing may be displayed higher in the search results and/or be featured in a more prominent and attractive fashion. The ordering of the listings is sometimes influenced by the extent to which enhanced content is available for the listing. Also, the enhanced content may be employed in the display of search results, such that the presence and quality of enhanced content associated with a listing may increase the attractiveness of the listing to the consumer. Further still, the merchant may desire to maximize the probability that a consumer that views additional information about a business will have a favorable impression of the business.

The above goals may be achieved by maximizing the presence and quality of enhanced content associated with a listing. The merchant associated with a listing may therefore desire to be listed with multiple search services. Unfortunately, the merchant currently needs to obtain their listing from each search service provider separately, i.e., they need to contact each of the search service providers separately, provide the listing information to each of the search service providers, and pay each of the search service providers separately. Moreover, if they wish to update their listing, each service provider needs to be contacted separately.

Assuming a listing is updatable at each of the search service providers, an update may take days, weeks, or more to be reflected at a consumer-facing Web site, mobile directory, application, etc., of each of the search service providers. Therefore, in the related art, updates cannot occur in real time or near real time. Moreover, the merchant cannot provide their customers with information about real-time or near real-time services, such as, for example, an offer of a discount coupon "for the next hour only."

SUMMARY OF THE INVENTION

The above-described problems are addressed and a technical solution is achieved in the art by providing a method and system for providing listings that include both NAP information and enhanced content (hereinafter "enhanced listings") to multiple search service providers from a single source system. According to an embodiment of the present invention, the source system receives listing identification data from a merchant. The listing identification data is transmitted to each individual provider system. Potential matching listings are received from each provider system. The potential matching listings are matched to the listing identification data previously supplied by the merchant, and a measure of certainty of a match for each provider system is determined. If a match is found for a given provider system that equals or exceeds a predetermined level or more of certainty, then a provider-supplied "External ID" for that match is recorded in the source system and is associated with the listing information provided by the merchant, and the returned listing data is recorded by the source system in the source system database as ready to be delivered to a provider system. If no such match is found, the source system presents the listing information from the provider system to the merchant (or an analyst working on behalf of the merchant).

According to an embodiment of the present invention, when the source system presents the listing information from the provider system to the merchant, the source system may receive from the merchant an indication as to whether returned listing data from a provider system matches the merchant's listing. If the merchant confirms a match, the returned listing data is recorded by the source system in the source system database as ready to be delivered to a provider system. If the merchant indicates that the returned listing data is incorrect, or if no probable match of returned listing data from the provider system was found, then the merchant searches directly for their listing on the provider system via a source system interface. If the provider system returns listing data that the merchant confirms as a match, then the provider-supplied External ID is recorded for the listing that the merchant confirmed in the database of the provider system. The listing data is also recorded by the source system in the source system database as ready to be delivered to a provider system after a cross check by a human operator.

According to an embodiment of the present invention, after completing a search on the provider system via a source system interface, the merchant may indicate that no listing on the provider system matches the merchant listing. In such circumstances, the source system records an indication in the source system database that the listing should be delivered to the provider system as a new listing to be added to the provider system after a cross check by a human operator.

According to an embodiment of the present invention, a cross check by a human operator may be conducted when the merchant has indicated that the merchant listing did not match the provider data automatically selected, and then has either indicated that another provider listing matches or that no provider listing matches. The human operator either accepts as a match returned listing data from the provider system that the merchant indicated as a non-match, accepts as a match the provider listing selected by the merchant, searches and selects the provider system himself for a different match of listing data via a source system interface, or indicates that no valid listing is present on the provider system. Accordingly, the returned listing data is recorded by the source system in the source system database as ready to be delivered to a provider system, either with the "External ID" included in the provider listing data selected as a match or, if no such listing was selected, with an indication that the merchant listing is to be added to the provider site.

According to an embodiment of the present invention, when listing data is recorded in the source system database as being ready for delivery, one or more methods of delivery may be selected to deliver an enhanced listing to the provider system. The selection of a deliver method may be based on (1) which methods are available on the provider system, (2) which data fields are included in the enhanced listing to be provided, and (3) which methods may cause the data fields associated with the enhanced listing to be sent to the provider system as quickly as possible. In one embodiment, all fields may be delivered through a single method. In another embodiment, some fields may be delivered through one method to provide faster delivery, while other fields may be delivered through a slower method.

According to an embodiment of the present invention, the following delivery methods are provided: (1) periodic feed files, (2) real-time API integration; (3) JavaScript enhanced content; and (4) frequent delta updates.

According to an embodiment of the present invention, in the periodic feed files listings delivery method, at periodic intervals, a file for each provider system containing associated target listings that are to become enhanced listings is generated for each provider system by the source system. This file contains NAP information and enhanced content for each of the merchant listings, and possibly the provider-supplied External ID previously identified and associated with the listing. If the provider-supplied external ID for a given listing is not provided, this is an indication that the listing does not exist on the provider system and should be created by the provider system. For each of the provider systems, the generated file is transmitted to the corresponding provider system.

According to an embodiment of the present invention, the provider system processes the received listings. If at least one new listing is found that does not have an External ID supplied, the provider system adds a listing into the provider database and generates an External ID for it. The provider then updates the listings in the provider database with the listing information (NAP and enhanced content) provided by the source system for each listing, identifying each by External ID. In this manner, the merchant listing information on each provider is added and updated from a single point, and, as a result, the enhanced listing is now present on each provider.

According to an embodiment of the present invention, in the real-time API integration listings delivery method, as soon as new or updated merchant listing information is provided to the source system and, as applicable, approved according to the methods described above, the source system contacts the provider system through a real-time API, and provides merchant listing information, including, but not limited to, NAP and enhanced content, as well as the corresponding "External ID" for the listing on the provider system (or an indication that this listing is to be added to the provider system). The provider system updates its database with the new listing information, and is made available to consumers searching for business listings on the provider site. If the source system is contacting the provider system concerning a listing for the first time, the provider system provides the source system (either substantially immediately, or after some interval) with the source system assigned Listing ID, the provider assigned External ID, and a URL where the consumer can expect to see the listing on the provider system. For any listings appearing for the first time, the merchant is provided with an indication that the listing is now in service on that provider, and supplies the merchant with a URL from which the provider listing associated with the business of the merchant may be seen.

According to an embodiment of the present invention, the periodic feed files delivery method or the real-time API integration delivery method may be augmented by a JavaScript enhanced content delivery method. The JavaScript enhanced content delivery method permits enhanced content to be updated for a listing in real-time even if a provider does not support real-time updates to its database (e.g., as in the periodic feed files delivery method), or if the provider does support updates to its database but cannot substantially immediately display the updates to a consumer (as may happen in the real-time API integration listings delivery method).

The JavaScript enhanced content delivery method is executed after completing the steps of the periodic feed files delivery method or the real-time API integration delivery method. In the JavaScript enhanced content delivery method, the provider system is configured to store in its database an indication that the listing with a particular External ID is to include JavaScript based enhanced content, possibly to include a promotional highlight, when displayed in a consumer Web browser. When the provider system provides listing information for any such listings to the consumer, the provider system may include a JavaScript in the Web page. This JavaScript runs on the consumer's Web browser, and is configured to contact the source system to obtain the enhanced content associated with the listing, identified by the External ID (or a source system ID) of the listing in question. The source system returns the most up-to-date enhanced content for the listing, which is then displayed to the consumer. Thus, the most up-to-date enhanced content, including, but not limited to, a real-time promotional highlight message, is displayed to the consumer, thus rendering a complete enhanced listing available to consumers on a provider system.

According to an embodiment of the present invention, a variation of the JavaScript enhanced content delivery method may be used. In this variation, the provider system requests the enhanced content in question directly from the source system through a server-to-server connection, and then serves this information to the consumer as though it were incorporated into the provider system database, although it has not been.

According to an embodiment of the present invention, the periodic feed files delivery method may be augmented with the frequent delta updates delivery method. In the frequent delta updates delivery method, the source system keeps track of all merchant listing records that are recorded either for the first time or for which the merchant has provided updated information. At regular intervals, for example, every five minutes, the provider system contacts the source system for an update. The source system delivers all of the updated listing information from the time since the last contact. The provider system processes this information by updating its own listing records based on the listing information supplied in the delta update. This up-to-date information is presented to consumers.

According to an embodiment of the present invention, in connection with the periodic feed files delivery method, the provider system may assemble a list of all of the listings with listing information controlled and updated by the source system, may generate a "receipt file" containing these listings, and may transmit the receipt file to the source system. The receipt file may include, for each listing, the source system-assigned Listing ID, the provider system-supplied External ID, and a URL where the consumer can expect to see the listing on the provider system. For any listings appearing for the first time, the merchant is provided with an indication that the listing is now in service on that provider, and supplies the merchant with a URL from which the provider listing associated with the business of the merchant may be seen.

According to an embodiment of the present invention, the methods described for delivering listings may be employed both when a listing is initially provided by the merchant to the source system, and when updates to the NAP or enhanced content for a listing is provided by the merchant to the source system.

BRIEF DESCRIPTION OF THE DRAWINGS

The present invention will be more readily understood from the detailed description of an exemplary embodiment presented below considered in conjunction with the attached drawings, of which:

FIG. 3 depicts a detailed system architecture of a system for providing enhanced listings to multiple search service providers from a single source, according to an embodiment of the present invention;

FIGS. 9A and 9B show an exemplary list of all of the listing that should be enhanced listings, as provided by the source system to the provider system;

FIG. 10 shows an exemplary receipt file containing the listings of FIGS. 9A and 9B;

FIG. 18 is a an example of a rendered Web page containing a non-consumer visible list of all listings that should receive a promotional message, indicated as a comma-separated list of Location IDs or External IDs;

Figure 1A:
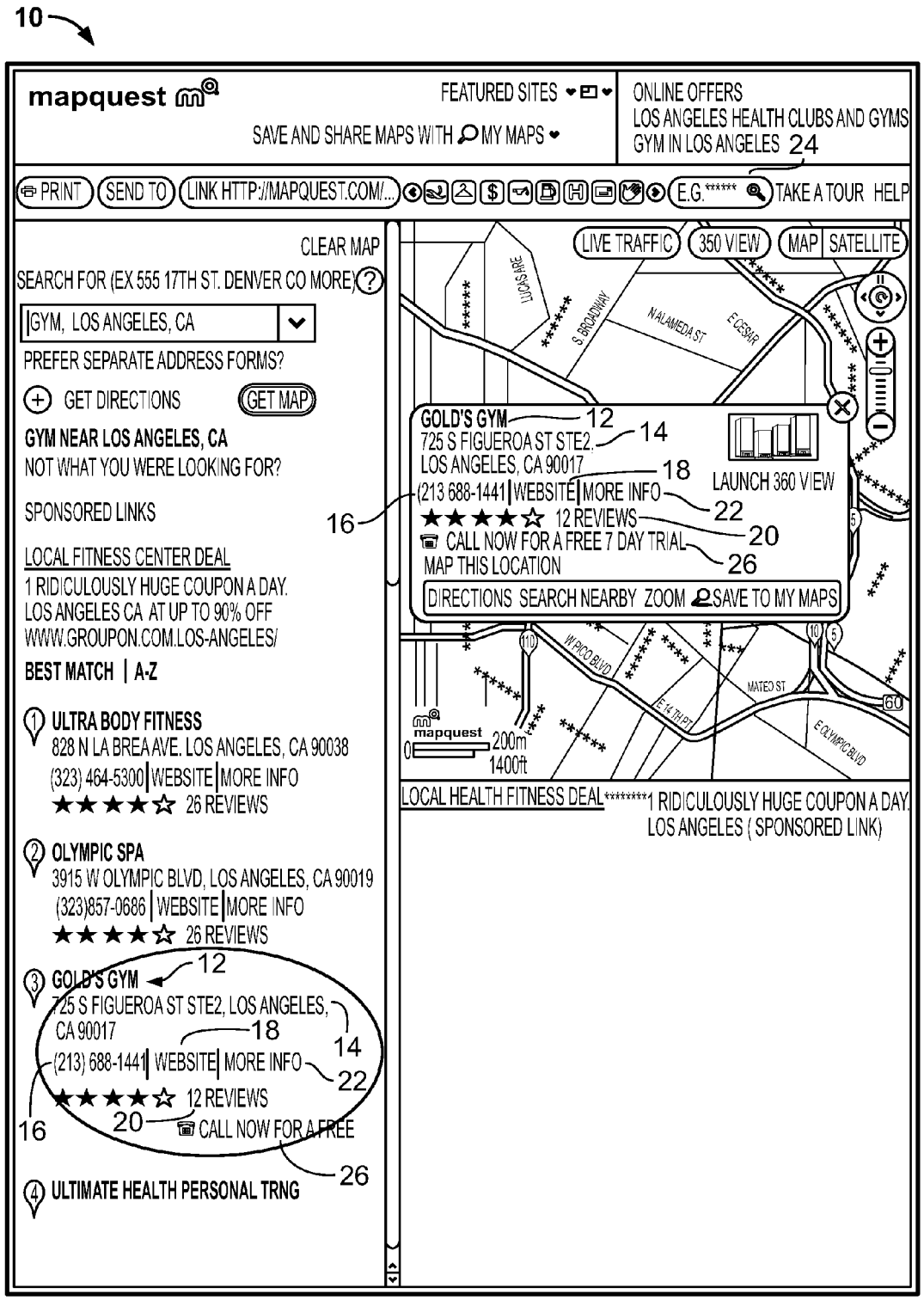
FIGS. 1A and 1B are exemplary screen shots of enhanced listings, according to an embodiment of the present invention.

It is to be understood that the attached drawings are for purposes of illustrating the concepts of the invention and may not be to scale.

DETAILED DESCRIPTION OF THE INVENTION

Methods and systems for enabling merchants to have their business listed in the so-called "organic search results" on a large number of directories (including Web sites, mobile apps, etc.) through a single product/system are provided. As used herein, the term "organic search results" refers to, but is not limited to, listings on search engine results pages that appear because of their relevance to the search terms, as opposed to their being advertisements. In contrast, non-organic search results may include pay per click advertising.

A merchant is permitted to list promotional material comprising enhanced content associated with a listing through, among other things, highlighted content in search results and more complete content in the business profile on the service provider. In some embodiments, a URL is provided to permit the merchant to see their promoted listing on each search service provider's Web site. The merchant is permitted to update their information (e.g., when they move or when their phone number changes) and enhance their listing (e.g., by adding or modifying photos, text descriptions, special offers, hours, etc., i.e., enhanced content) from a single point substantially in real-time or near real-time.

The term "computer" or "computer platform" is intended to include any data processing device, such as a desktop computer, a laptop computer, a tablet computer, a mainframe computer, a server, a handheld device, a digital signal processor (DSP), an embedded processor (an example of which is described in connection with FIG. 20 hereinbelow), or any other device able to process data. The computer/computer platform is configured to include one or more microprocessors communicatively connected to one or more non-transitory computer-readable media and one or more networks. The term "communicatively connected" is intended to include any type of connection, whether wired or wireless, in which data may be communicated. The term "communicatively connected" is intended to include, but not limited to, a connection between devices and/or programs within a single computer or between devices and/or separate computers over a network. The term "network" is intended to include, but not limited to, OTA (over-the-air transmission, ATSC, DVB-T), packet-switched networks (TCP/IP, e.g., the Internet), satellite (microwave, MPEG transport stream or IP), direct broadcast satellite, analog cable transmission systems (RF), and digital video transmission systems (ATSC, HD-SDI, HDMI, DVI, VGA), etc.

The one or more computer readable media may be used for storing the instructions to be executed by the one or more processors, including an optional operating system, such as the Windows or the Linux operating system. The computer readable media may further be used for the storing and retrieval of data in one or more databases. The computer readable media may include a combination of volatile memory, such as RAM memory, and non-volatile memory, such as flash memory, optical disk(s), and/or hard disk(s). Portions of the data stored in the computer readable media may be provided by one or more human users at one or more monitors. The monitor (s) may be equipped with a keyboard and a mouse for selecting objects of interest by the user or for inputting data.

Figure 1B:
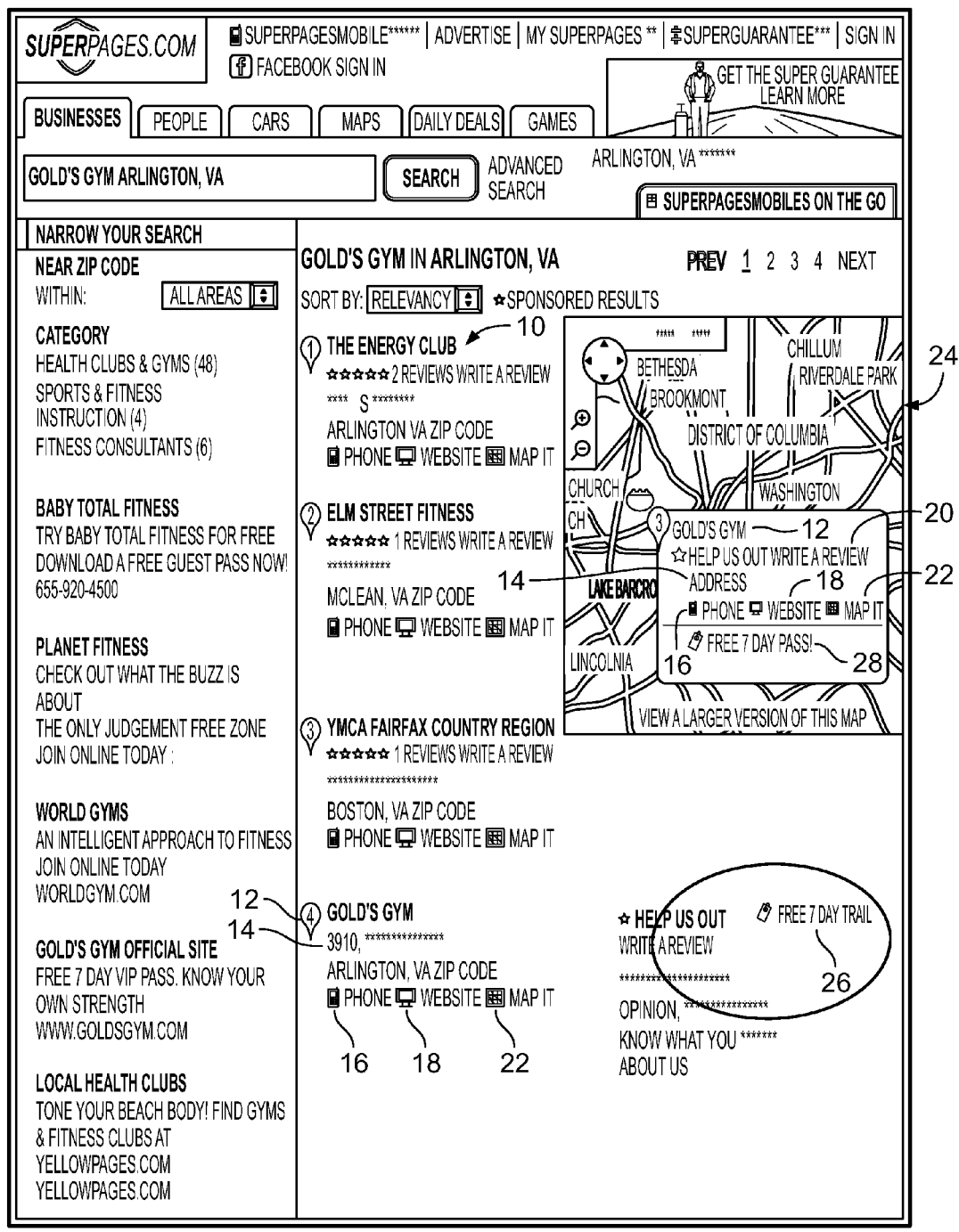

FIGS. 1A and 1B are exemplary screen shots of enhanced listings, according to an embodiment of the present invention. Exemplary listings 10 (e.g., Gold's Gym) may include, but are not limited to, a business name 12, address 14, telephone number 16, a link to a website for the business 18, user review information 20, a pointer to a map 22 of the location of the business, the business location on a map 24, a promotional message 26, etc.

Figure 2A:
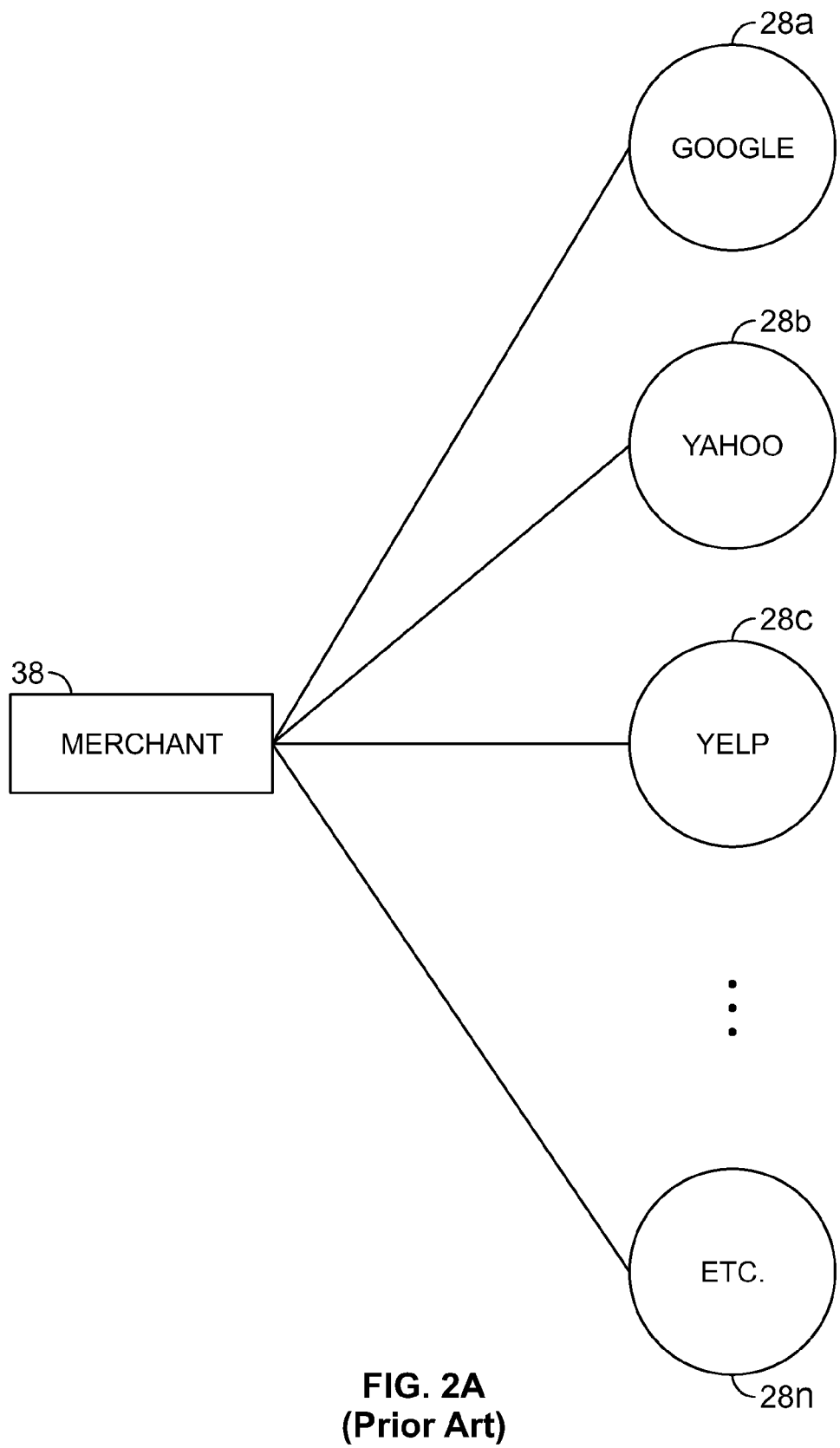
FIG. 2A depicts a conventional high level architecture for a merchant contacting multiple search service providers to add new listings with enhanced content, to correct NAP information, or to add enhanced content to existing listings.
Figure 2B:
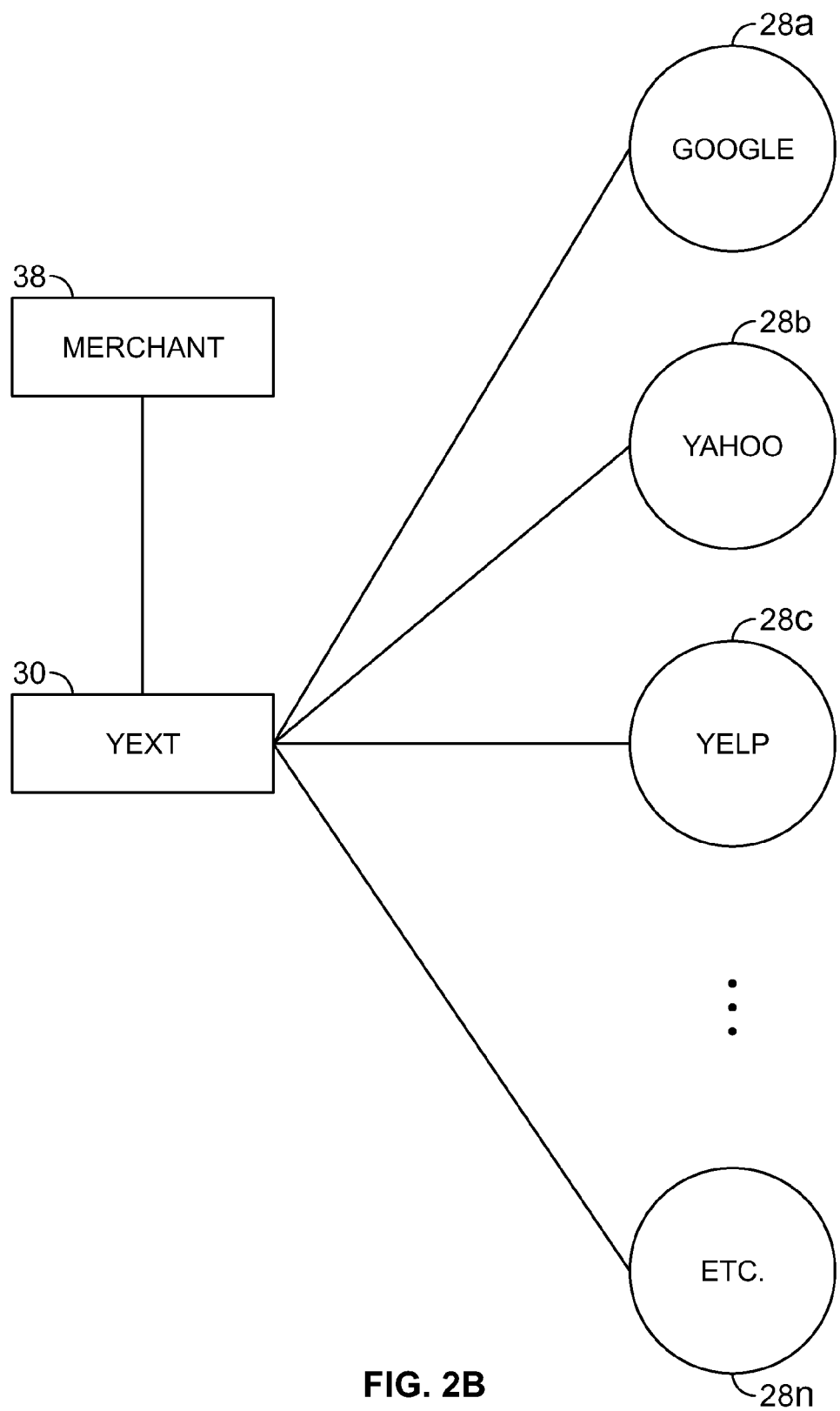
FIG. 2B depicts a high level system architecture for a merchant accessing a single source system for providing listings including NAP information and enhanced content (together "enhanced listings") to multiple search service providers, according to an embodiment of the present invention.

FIG. 2A depicts a conventional high level architecture for a merchant 38 obtaining and managing business listings from multiple search service providers 28a-28n. As described hereinabove, the merchant 38 that desires to place a listing or correct an existing listing needs to do so with each of the search service providers 28a-28n (e.g., Google, Yahoo, Yelp, etc.) directly and separately, thereby needlessly duplicating effort that is substantially prone to errors accumulated over time. FIG. 2B depicts a high level system architecture for a merchant 38 accessing a single source system 30 for providing enhanced listings to multiple search service providers 28a-28n, according to an embodiment of the present invention. In contrast to the architecture of FIG. 2A, in FIG. 2B, the merchant 38 needs only to access the single source system 30 for entering a common listing that is propagated from the single source system 30 in real or near-real time to the search service providers 28a-28n, reducing error significantly and permitting multiple types of enhanced features to be described hereinbelow.

FIG. 3 depicts a detailed system architecture of a single source system 30 for providing enhanced listings to multiple search service providers, according to an embodiment of the present invention. The system 30 may be executed on one or more computer platforms 32, 34a-34n, interconnected by one or more networks 36, which may include the Internet. A central computer platform 32 (hereinafter "the source system 32") include a plurality of software modules 102, 104, 106, 109, 110, 114 (to be described hereinbelow in connection with FIGS. 4-20) that are communicatively connected with a merchant 38, one or more human operators 40, a plurality of service provider computer platforms 34a-34n (hereinafter "the provider system(s) 34a-34n"), and a system database 42. Each of the service provider computer platforms 34a-34n provides a plurality of modules 108, 112, 116, 150 with which the source system 32 interacts for carrying out operations and providing result data between the source system 32 and the service provider computer platforms 34a-34n.

A plurality of provider application programming interfaces (APIs) 108 permits the source system 32 to search for matching listings as part of a matching process. The provider API searcher 106 is configured to accommodate existing APIs 108 provided that it meets system standards. In certain circumstances, a provider may need to modify their API 108 so that it may operate properly with the source system 32. The provider listing update APIs 150 are configured to receive information about new and updated listings to display from the listing delivery engine 114. Should a provider not be able to supply a provider listing update API 150, the provider may supply a periodic feed receiver 112 for processing periodic data updates generated by the source system 32 containing listings that should contain enhanced content. These are modules designed by each of the providers. They are generally designed to accommodate a source system enhanced listings format. The provider directory site/mobile app/etc. 116 is a module that serves the directory sites with which a consumer interacts, e.g., MapQuest.com, the MapQuest iPhone app, etc.

The modules 108, 112, 116, 150 are, in turn, are communicatively connected to a plurality of user devices running some form of communication software, preferably in a consumer Web browser 120 over a network, such as the Internet 36, and a provider database 44a-44n. In a preferred embodiment, the computer platform 32 may be communicatively connected to each of the plurality of user devices via a PowerListings JavaScript 118 running in the consumer Web browser 120 when enhanced content is pulled directly from a consumer Web browser 120 or device, rather than passing through a service provider computer platform (e.g., 34a) (to be described hereinbelow in connection with FIG. 4-20). In such circumstances, the PowerListings JavaScript 118 (either provided by the system provider or written by the service provider and included within a Web page) calls the real-time content server 110 and obtains the needed enhanced content. Alternatively, the PowerListings JavaScript 118 may be replaced with, for example, a mobile application or some other non-Web application. In such circumstances, the mobile or external application may communicate directly with the real-time content server 110 to obtain the real-time content updates. However, in the preferred embodiment, a request typically passes through a service provider computer platform (e.g., 34a) rather than having a direct connection between the application running on the consumer's device and the real-time content server 110.

Figure 4:
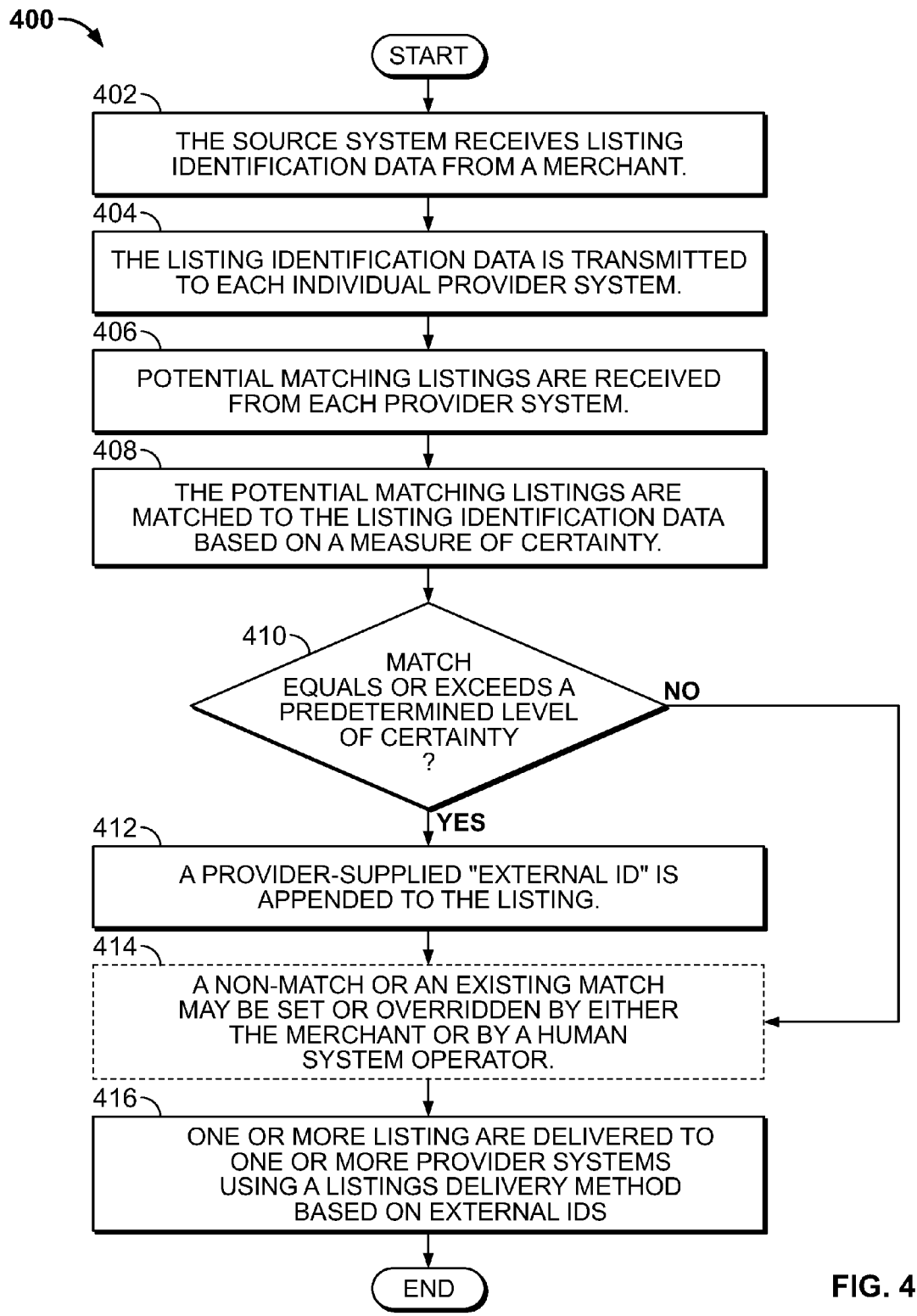
FIG. 4 is a process flow diagram illustrating exemplary steps for providing enhanced listings to multiple search service providers from a single source system, according to an embodiment of the present invention.

FIG. 4 is a process flow diagram 400 illustrating exemplary steps for providing enhanced listings to multiple search service providers 34a-34n from the single source system 32, according to an embodiment of the present invention. In step 402, the source system 32 receives listing identification data from a merchant 38. In Step 404, the listing identification data is transmitted to each individual provider system 34a-34n. In step 406, potential matching listings are received from each of the provider systems 34a-34n. In Step 408, the potential matching listings are matched to the listing identification data based on a measure of certainty. In step 410, if a match equals or exceeds a predetermined level of certainty, then in Step 512, a provider-supplied "External ID" is appended to the listing. Optionally, in Step 414, a non-match or an existing match may be overridden by either the merchant 38 or by a human system operator 40. In Step 416, one or more listings are delivered to one or more provider systems 34a-34n using a listings delivery method based on External IDs.

Figure 5:
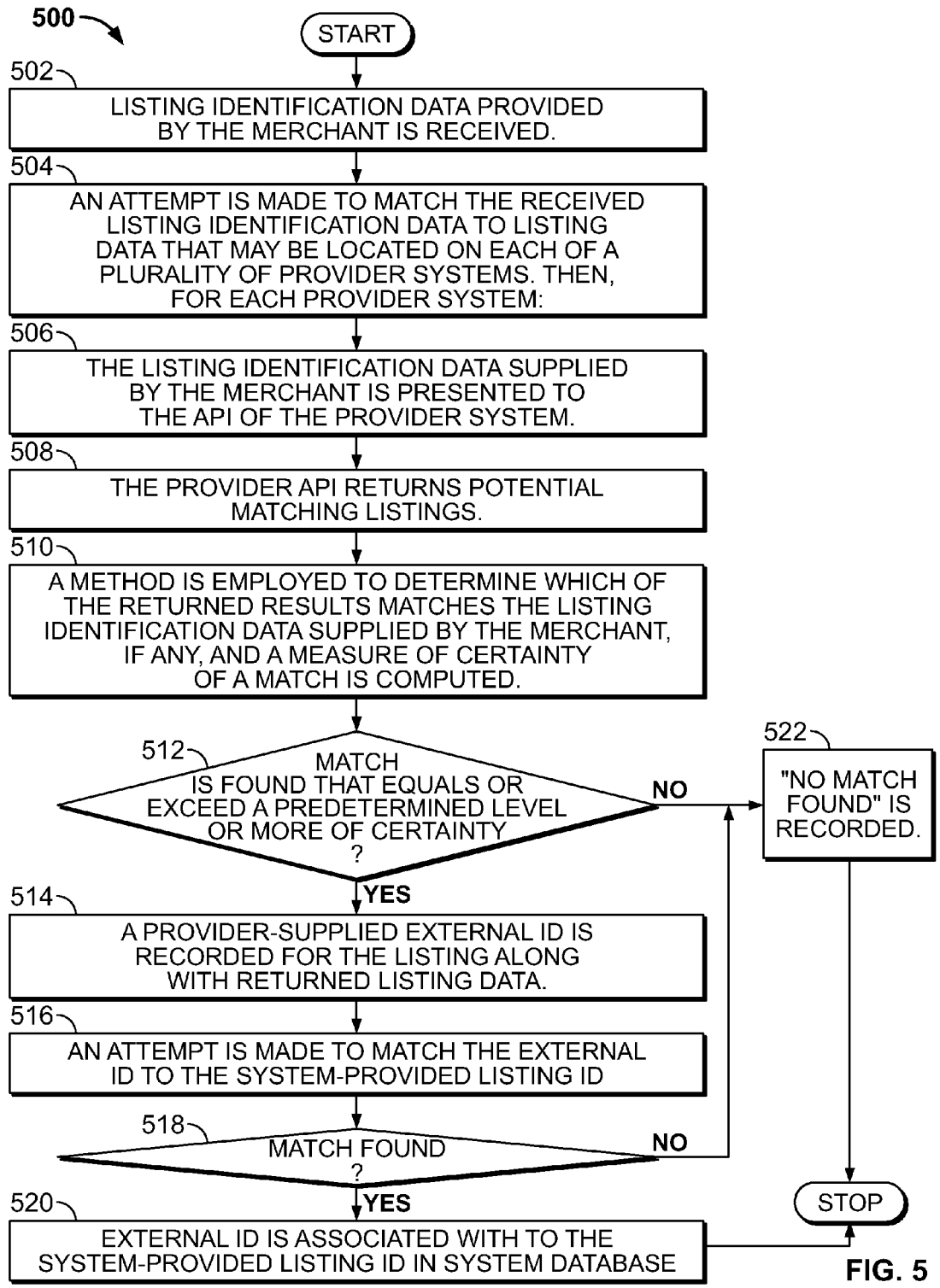
FIG. 5 is a process flow diagram illustrating exemplary steps for retrieving at least one merchant listing(s) from a plurality of systems based on listing identification data entered by the merchant, according to an embodiment of the present invention.

FIG. 5 is a process flow diagram 500 illustrating exemplary steps for retrieving at least one merchant listing(s) from the one or more provider systems 34a-34n based on listing identification data entered by the merchant 38, according to an embodiment of the present invention. In Step 502, the PowerListings Web application 102 receives listing identification data provided by the merchant 38, which may include, but is not limited to, a business name, address, and telephone number (in certain embodiments, more than one set of listing identification data may be provided by the merchant 38, e.g., for multiple branches of a single chain business). In Step 504, the PowerListings backend coordinator 104 sends a message to a provider API searcher 106 to attempt to find a listing matching the received listing identification data to listing data that may be located on each of the plurality of provider systems 34a-34n. Then, for each individual provider system (e.g., the provider system 34a), Steps 506-516 are executed as described hereinbelow.

In Step 506, the provider API searcher 106 invokes a provider API 108 with the listing identification data supplied by the merchant 38. In Step 508, the provider API 108 of the provider system 34a may return potential matching listings to the provider API searcher 106. In Step 510, the provider API searcher 106 employs a method to determine which of the returned results matches the listing identification data supplied by the merchant 38, if any, and a measure of certainty of a match for the provider system 34a. Each potential match is given a score that indicates the system's level of certainty that the potential match listings corresponds with the listing identification data supplied by the merchant. To calculate this score, the system normalizes the core listing information supplied by the merchant and returned with each potential match. Then the system assigns up to one point for similarity of each of the following data fields: name, address (including city, state, and postal code), and primary phone number. The system also assigns points for matches of non-primary phone numbers and merchant URL. If a match has at least three points—which can happen only if the name, address, and primary phone number match exactly, or if two of the three match and the other fields match exactly—the listing is considered to be so perfect a match that it can be recorded as a listing match without merchant verification (i.e., equal to or above a predetermined level of certainty). If it has a match of at least one point, then it is considered a possible match and can be presented to the merchant as such. Otherwise, it is considered that there are no possible matches.

In Step 512, if a match is found that equals or exceed a predetermined level or more of certainty, then in Step 514, the provider API searcher 106 records a provider-supplied "External ID" for the listing along with returned listing data (e.g., the name, address, telephone number, and URL associated with the listing found on the provider system 34a) in the system database 42; otherwise, processing proceeds to step 522. As used herein, an External ID refers to a unique identifier that each of the provider systems 34a-34n has assigned to a listing for their own purposes. This contrasts with a system-provided "Listing ID" that is a unique identifier assigned by the source system 32 to the same listing on a per provider/per listing basis. In step 516, a matching process is conducted by the source system 32, wherein an attempt is made to determine the External ID of the listing on the provider's system that most closely matches the listing with the system-provided Listing ID. The purpose of the matching process is to ascertain whether there is a corresponding listing on the server provider's side. If, in step 518, a match is found, then in step 520, the provider-supplied External ID is associated with the system-supplied Listing ID in the system database 42 for the provider system (e.g., 34a). If, in Step 516, no match was retuned, then in Step 522, the provider API searcher 106 records "no match found" in the system database 42 for the provider system 34a. Also, a "no External ID corresponding to the Listing ID" in question is recorded in the database 42 for the provider system 34a.

Figure 6:
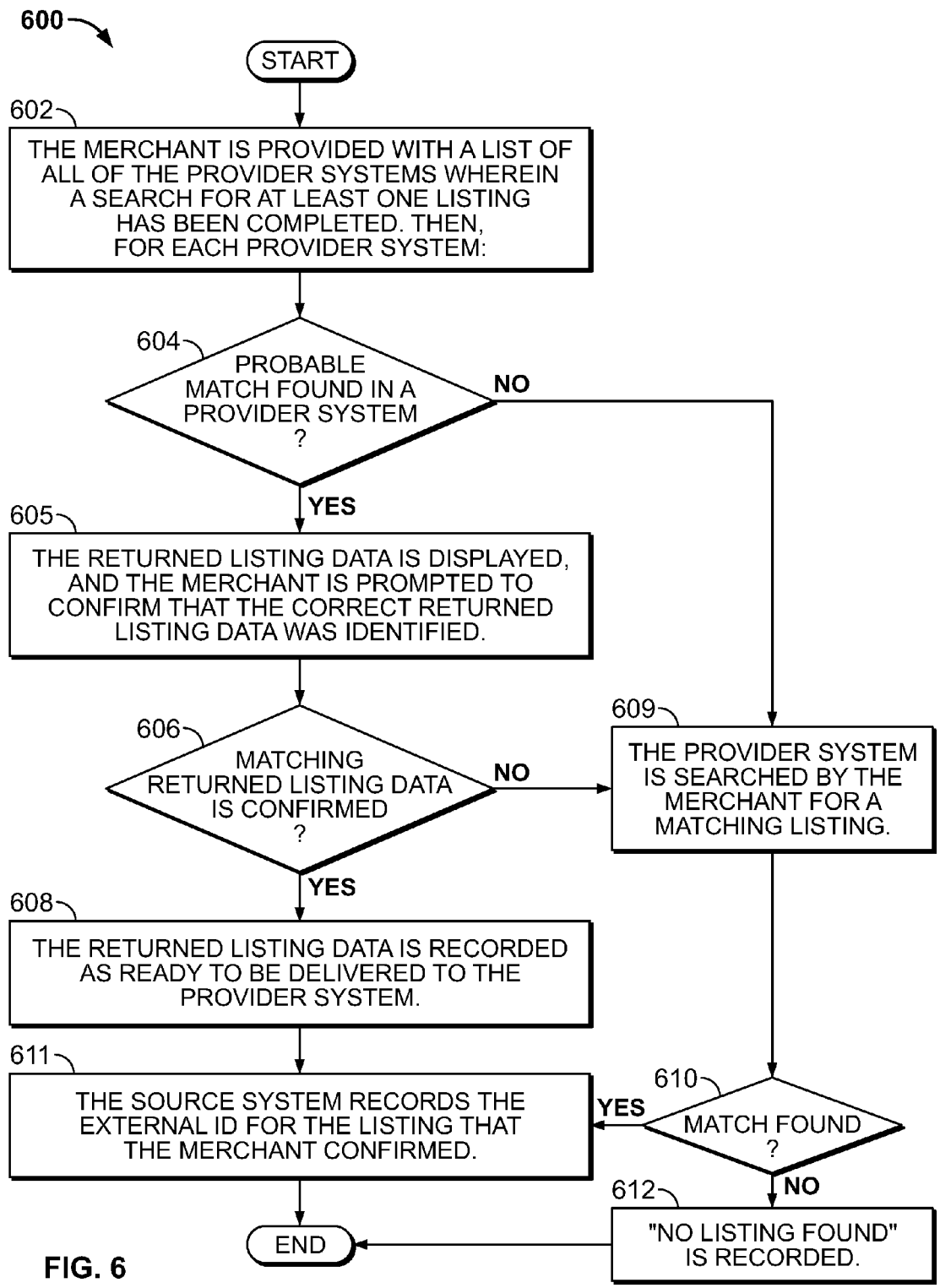
FIG. 6 is a process flow diagram illustrating exemplary steps for receiving an indication from a merchant as to whether returned listing data received from at least one provider system is valid, according to an embodiment of the present invention.

FIG. 6 is a process flow diagram 600 illustrating exemplary steps for the source system 32 receiving an indication from the merchant 38 as to whether returned listing data received from a provider system 34a is valid, according to an embodiment of the present invention. In Step 602, the PowerListings Web application 102 provides the merchant 38 with a list of all of the provider systems 34a-34n wherein a search for at least one listing has been completed. Then, for each individual provider system (e.g., the provider system 34a), Steps 604-612 are executed as described hereinbelow.

In Step 604, if a probable match was found, then in Step 605, the PowerListings Web application 102 displays the returned listing data (e.g., the name, address, and phone number) as supplied by the provider system 34a, and prompts the merchant 38 to confirm that the correct returned listing data was identified. If, in Step 606, the merchant 38 confirms a matching returned listing data, then in Step 608, the returned listing data is recorded by the source system 32 in the system database 42 along with an indication that the returned listing data is "ready to be delivered to the provider system" 34a as described hereinbelow. If, in Step 604, the merchant 38 indicates that the returned listing data is incorrect, or if no probable match of returned listing data from the provider system 34a was found, then in Step 609, the merchant 38 searches directly for their listing on the provider systems 34a via queries made through the PowerListings Web application 102, the provider API searcher 106, and the provider API 108 of the provider system 34a. If, in step 610, as a result of the queries in Step 609, the provider system 34a returns listing data that the merchant 38 confirms as a match, then in Step 611, the source system 32 records the provider-supplied External ID for the listing that the merchant 38 confirmed in the system database 42 for the provider system 34a. If, in Step 606, the provider system 34a does not return listing data or, in Step 610, none of the returned listing data is considered a match by the merchant 38, then in Step 612, the source system 32 records a "NO LISTING FOUND" or some other negative indication in the system database 42 for the provider system 34a. Also, a "no External ID corresponding to the Listing ID" in question is recorded in the system database 42 for the provider system 34a.

Figure 7:
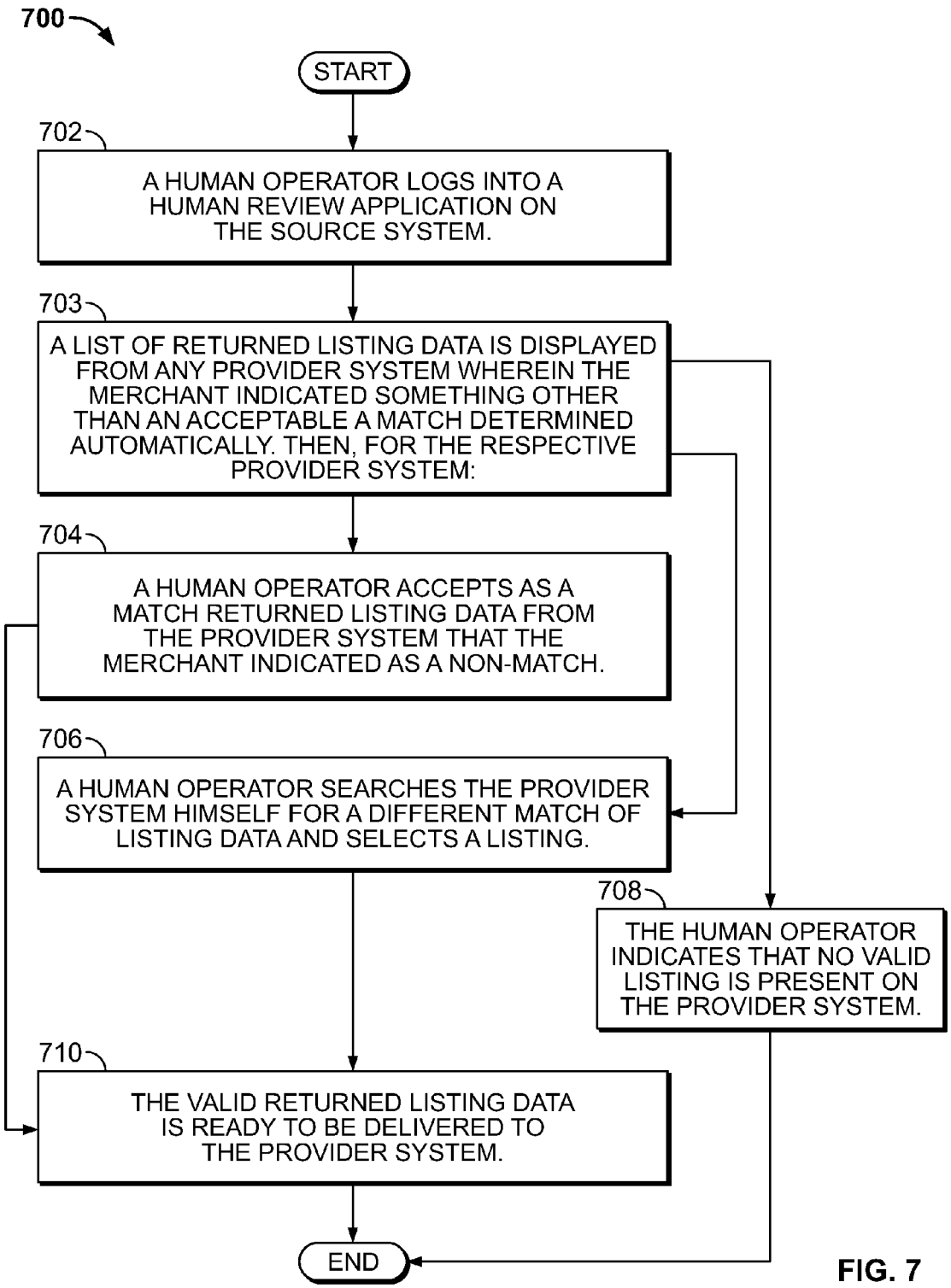
FIG. 7 is a process flow diagram illustrating exemplary steps for receiving a cross check on returned listing data indicated as not matching by the merchant, according to an embodiment of the present invention.

FIG. 7 is a process flow diagram 700 illustrating exemplary steps for the source system 32 receiving a cross check on returned listing data indicated as not matching by the merchant 38 from Step 606 of FIG. 6 above, according to an embodiment of the present invention. In Step 702, a human operator 40 logs into a human review application 110 on the source system 32. In Step 703, the human review application 110 displays a list of returned listing data from the provider system 34a wherein the merchant 38 indicated something other than an acceptable match determined automatically as described hereinabove. Via a selection from the human review application 110, the human operator 40 either accepts as a match in Step 704 returned listing data from the provider system 34a that the merchant 38 indicated as a non-match, searches and selects in Step 706 the provider system 34a himself for a different match of listing data via the provider API searcher 106, or indicates in Step 708 that no valid listing is present on the provider system 34a. If at least one returned listing is confirmed by either the merchant 38 or the human operator 40 as valid, in Step 710, the valid returned listing data is ready to be delivered to the provider system 34a as described hereinbelow. Also, the provider-supplied external ID for the listing that was selected by the human operator 40 is stored with the valid listing and associated with a system-supplied Listing ID in the system database 42. The execution of Steps 702-710 prevents fraudulent changes of any portion of listing data by non-authorized person(s) (e.g., setting name, telephone number, or images for one listing to the data for some listing on the provider system that does not correspond to it).

Figure 8A:
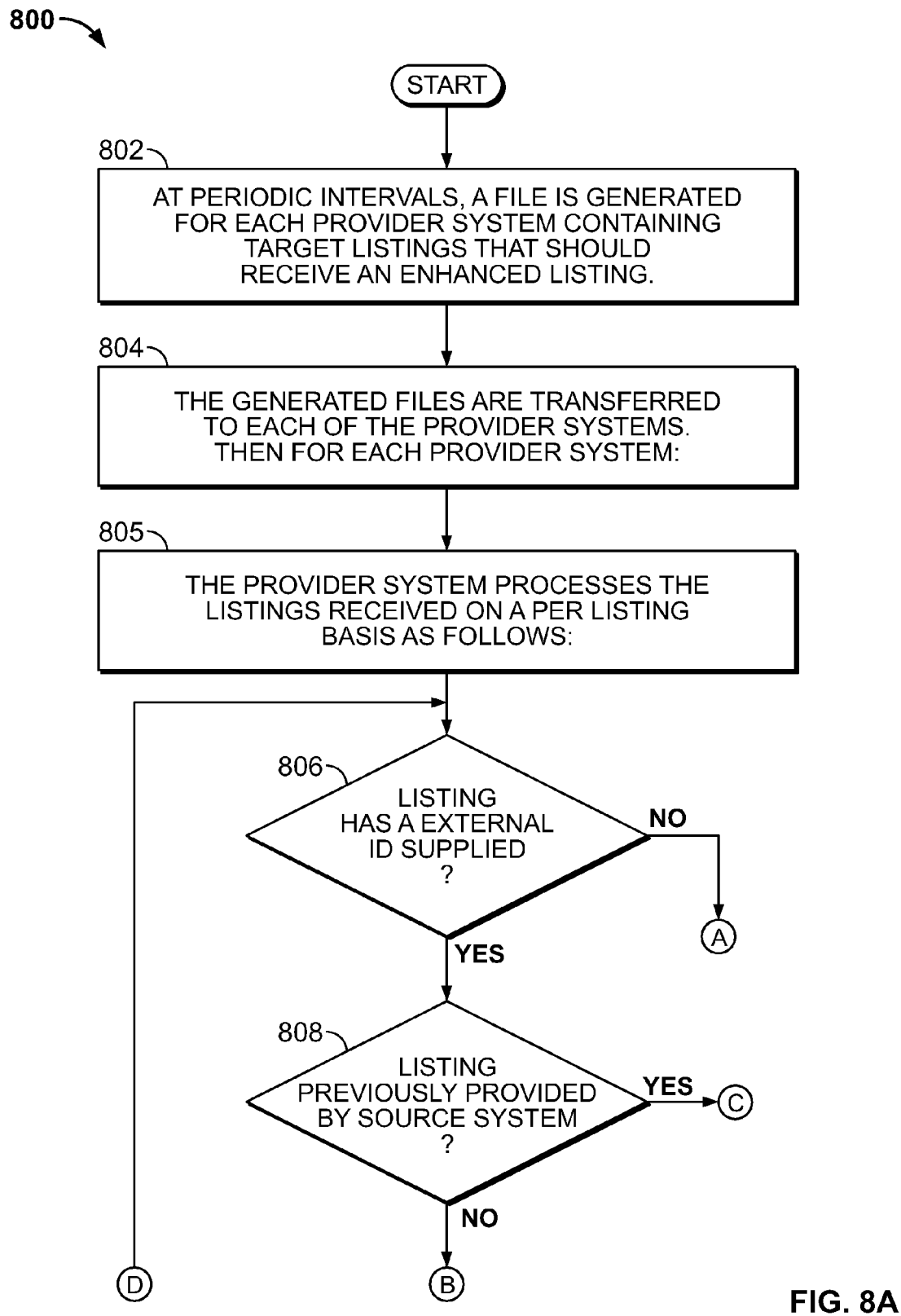
FIGS. 8A and 8B are process flow diagrams illustrating exemplary steps for delivering enhanced listings to each of the provider systems employing a periodic feed files delivery method, according to an embodiment of the present invention.
Figure 8B:
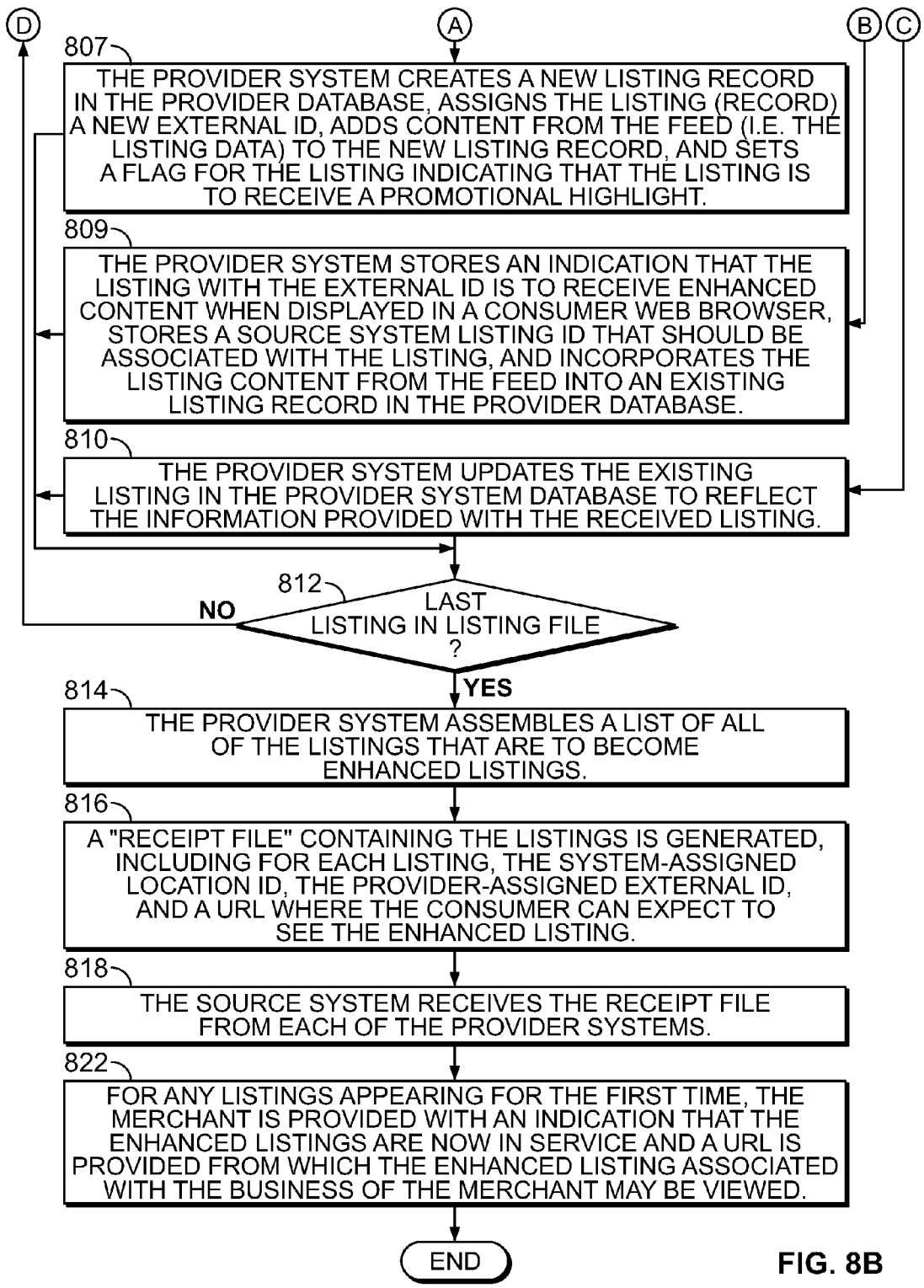

FIGS. 8A and 8B are a process flow diagram 800 illustrating exemplary steps for the source system 32 delivering enhanced content, including possibly a promotional tag and message, to each of the provider systems 34a-34n from a single source (i.e., the source system 32) employing a periodic feed files delivery method, according to an embodiment of the present invention. In Step 802, at periodic intervals, e.g., each day, a listings delivery engine 110 generates a file for each provider system 34a-34n containing associated target listings that should receive one or more enhanced listings is generated for each provider system 34a-34n. This file may include, but is not limited to, NAP information, enhanced content for each of the merchant listings, and the provider-supplied external ID previously identified and associated with the listing, if available. If the provider-supplied external ID for a given listing is not provided, this is an indication that the listing does not exist on the provider system (e.g., 34a) and should be created by the provider system (e.g., 34a). In Step 804, for each of the provider systems 34a-34n, the generated file is transmitted to the corresponding provider system (e.g., 34a). The listings delivery engine 110 transfers a corresponding generated file to the corresponding provider system (e.g., 34a) via a corresponding provider periodic feed receiver 112 (using mechanisms that may include, for example, HTTP, FTP, or a custom API). Then, for each individual provider system (e.g., the provider system 34a), Steps 805-822 are executed as described hereinbelow.

In Step 805, the provider system 34a processes the listings file received in Step 804 on a per listing basis. In step 806, a query is made whether the listing contains an external ID. If, in step 806, the listing does not have an external ID, then in Step 807, the provider system (e.g., 34a) creates a new listing record in the provider database 44a, assigns the listing (record) a new external ID, adds content from the feed (i.e. the listing data) to the new listing record, and sets a flag for the listing indicating that the listing is to receive a promotional highlight when displayed in a consumer Web browser 120 as provided by the corresponding provider directory site 116. If, in Step 806, an external ID for the listing was supplied, then in step 808, a query is made whether the listing was provided before by the source system 32. If, in step 808, an external ID was supplied, but the listing was not previously provided by the source system 32 (i.e., it was previously associated with a listing via selection by either the human operator 40 via the a human review application 110 or via the merchant 38 via the tags Web application 102 on the source system 32), then in Step 809, the provider system (e.g., 34a) stores an indication that the listing with the External ID is to receive enhanced content when displayed in a consumer Web browser 120 as provided by a provider directory site 116 associated with the provider system 34a, stores a source system listing ID that should be associated with the listing, and incorporates the listing content from the feed into an existing listing record in the provider database (e.g., 44a) (e.g., NAP and enhanced content). If, in Step 808, an external ID was supplied, and a listing was previously provided by the source system 32, then, in Step 810, the provider system 34a updates the existing listing in the provider database 44a to reflect the information provided with the received listing. In Step 812, a query is made whether there are any more listings in the listing file to be processed. If, in Step 812, the last listing in the listing file has not been processed, then execution returns to Step 806; otherwise, processing proceeds to Step 814.

In Step 814, the provider system 34a assembles a list of all of the listings that the provider system 34a indicates should have an enhanced listing (See FIGS. 9A and 9B), and in Step 816, the provider periodic feed interface 112 corresponding to the provider system 34a generates a "receipt file" containing these listings, including for each listing, the system-assigned Listing ID, an External ID, and a URL where the consumer 46 can expect to see the promotional listing on the provider system (See FIG. 10). In Step 818, the source system 32 receives the receipt file from each of the provider systems 34a-34n wherein the provider periodic feed interface 112 returns the receipt file to the listings delivery engine 114. The PowerListings backend coordinator 104 receives the receipt files from provider periodic feed interface 112. In Step 820, for any listings appearing for the first time as determined by a query into the system database 42 by the tags backend coordinator 104, the PowerListings backend coordinator 104 provides the merchant via the tags Web application 102 with an indication that that the enhanced listings are now in service, and supplies the merchant 38 with a URL from which the enhanced listing associated with the business of the merchant 38 may be seen. (According to an embodiment of the present invention, the backend coordinator 104 may employ a Web crawler to confirm that the enhanced listing is visible on the supplied URL and that all content, including the promotional highlight and message, name, address, phone, descriptions, photos, etc. is visible and correct, before notifying the merchant 38 that the enhanced listing is live).

FIGS. 9A and 9B show an exemplary list of all of the listings 900 that should be enhanced listings, as provided by the source system 32 to the provider system 34a. Reference 902 points to a first listing in XML. Reference 904 points to an example of an External ID. Reference 906 points to an example of a promotional message. Reference 908 points to the beginning of a second listing, while reference 910 points to the end of the second listing.

FIG. 10 shows an exemplary receipt file 1000 containing the listings of FIGS. 9A and 9B. Each block 1002 includes, for example, pairs of source system provided IDs 1004 and associated External IDs 1006.

Figure 11:
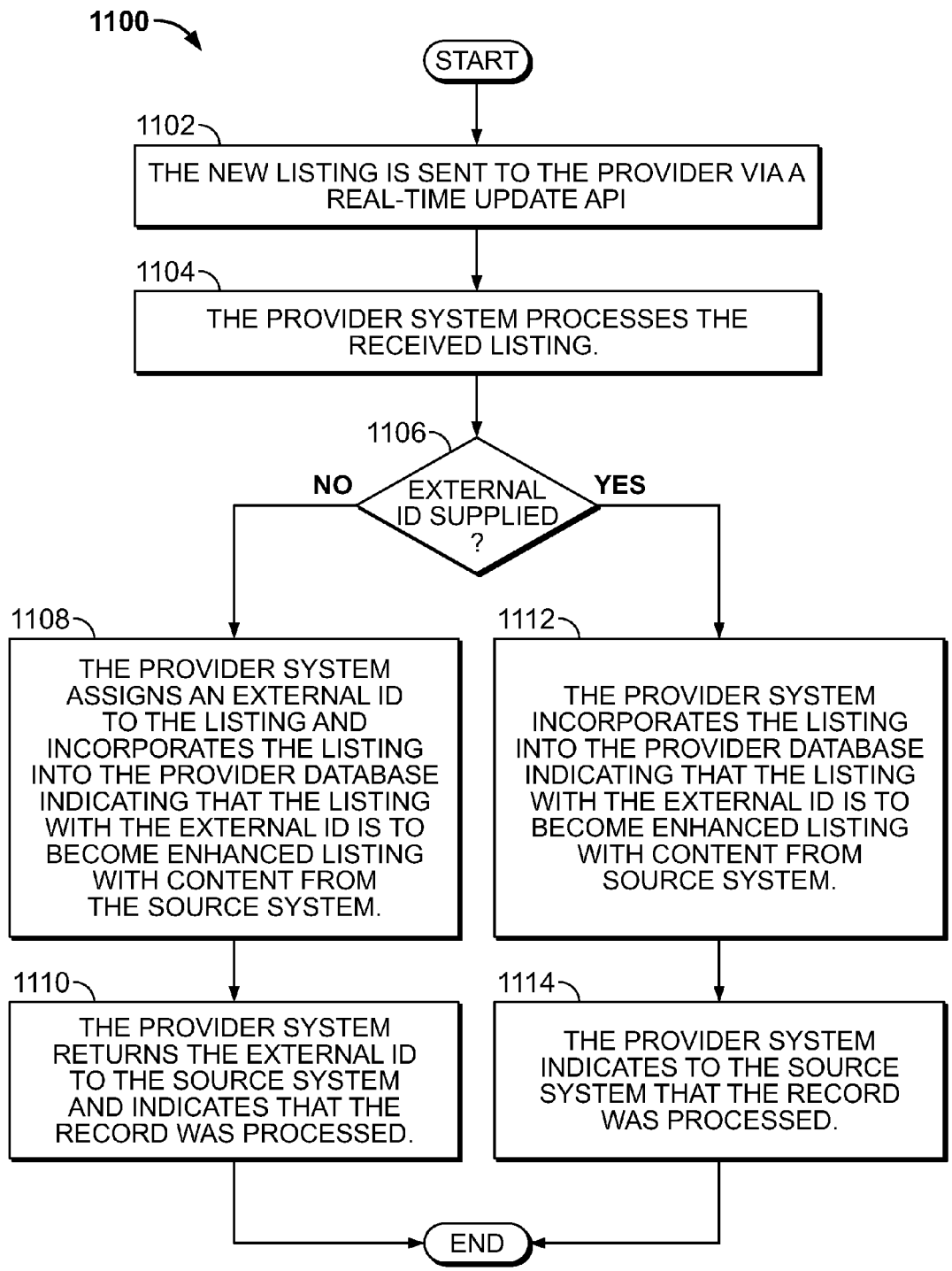
FIG. 11 is a process flow diagram illustrating exemplary steps for the source system delivering enhanced content to each of the provider systems from a single source (i.e., the source system) employing a real-time API integration delivery method, according to an embodiment of the present invention.

FIG. 11 is a process flow diagram 1100 illustrating exemplary steps for the source system 32 delivering enhanced content to each of the provider systems 34a-34n from a single source (i.e., the source system 32) employing a real-time API integration delivery method, according to an embodiment of the present invention. In Step 1102 the source system's listing delivery engine 114 transmits the new listing to the provider listing update API 150. In Step 1104, the provider system (e.g., 34a) processes the received listing by applying different logic in Step 1106 based on whether the source system 32 supplies an External ID. If, in Step 1106, no External ID for the listing is provided, this is an instruction to the provider system (e.g., 34a) to add a new listing. In Step 1108, the provider system (e.g., 34a) adds the new listing in near real-time, assigns it an External ID, and records an indication that it should be an enhanced listing, including saving any enhanced content that was transmitted along with it by the source system 32. In Step 1110, the provider system (e.g., 34a) returns the newly-assigned External ID to the source system 32 along with confirmation that the listing will become an enhanced listing. If, in Step 1106, the source system 32 had transmitted an External ID, the provider system (e.g., 34a) saves an indication in its database (e.g., 44a) that the listing should be an enhanced listing (Step 1112) and sends a confirmation to the source system 32 that the request was processed (Step 1114).

According to an embodiment of the present invention, the periodic feed files delivery method or the real-time API integration delivery method may be augmented by a JavaScript enhanced content delivery method. The JavaScript enhanced content delivery method permits enhanced content to be updated for a listing in real-time even if a provider system (e.g., 34a) does not support real-time updates to its database (e.g., 44a) (e.g., as in the periodic feed files delivery method), or if the provider system (e.g., 34a) does support updates to its database (e.g., 44a) but cannot substantially immediately display the updates to a consumer (as may happen in the real-time API integration listings delivery method).

The JavaScript enhanced content delivery method is executed after completing the steps of the periodic feed files delivery method or the real-time API integration deliver method.

Figure 12:
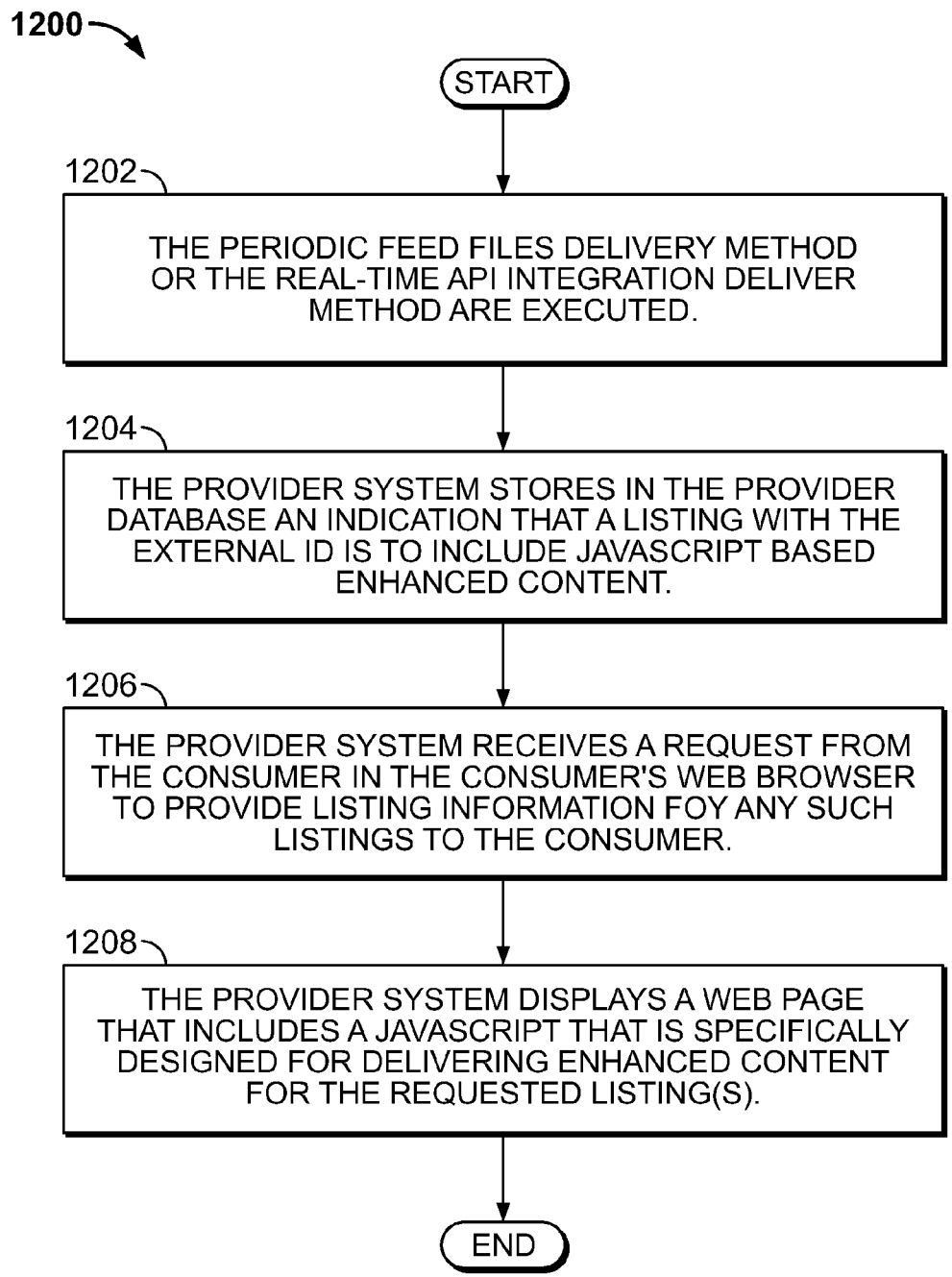
FIG. 12 is a process flow diagram illustrating exemplary steps for the source system delivering enhanced content to each of the provider systems from a single source (i.e., the source system) employing a JavaScript enhanced content delivery method, according to an embodiment of the present invention.

FIG. 12 is a process flow diagram illustrating 1200 exemplary steps for the source system 32 delivering enhanced content to each of the provider systems 34a-34n from a single source (i.e., the source system 32) employing a JavaScript enhanced content delivery method, according to an embodiment of the present invention. In step 1202, the periodic feed files delivery method or the real-time API integration deliver method are executed. In at step 1204, the provider system 34a stores in the provider database 44a an indication that a listing with the External ID is to include JavaScript based enhanced content, possibly to include an optional promotional highlight when displayed in a consumer Web browser 120. In Step 1206, when the provider system 34a receives a request from the consumer 46 from the consumer's Web browser to provide listing information for any such listings to the consumer 46, then in Step 1208, the provider system 34a displays a Web page that includes a JavaScript 118 that is specifically designed for delivering enhanced content for the requested listing(s).

According to one embodiment of the present invention, a variation of the JavaScript enhanced content delivery method may be used. In this variation, the provider system 34a requests the enhanced content in question directly from the source system 32 through a server-to-server connection, and then serves this information to the consumer 46 as though it were incorporated into the provider system database 44a, although it has not been.

Figure 13:
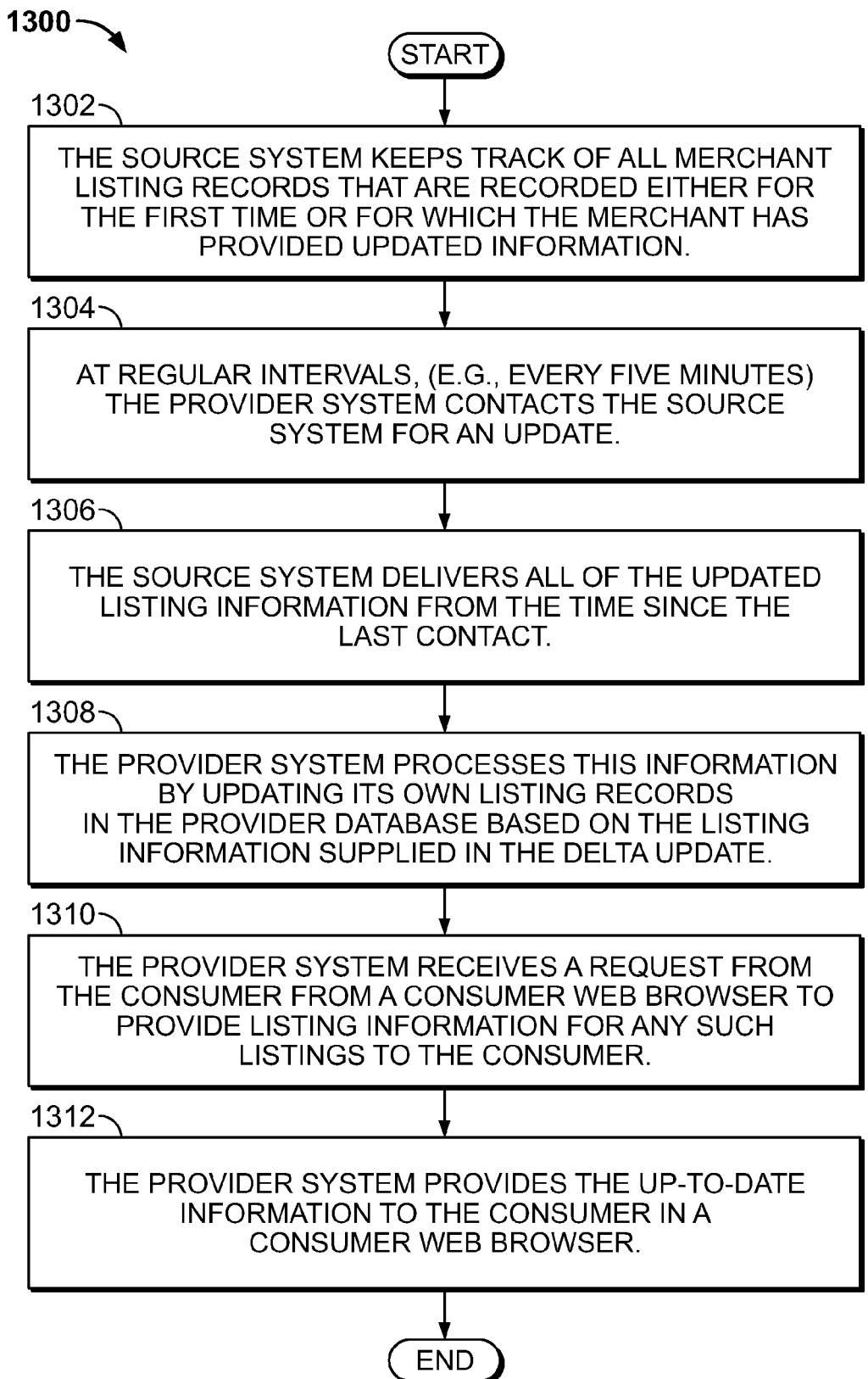
FIG. 13 is a process flow diagram illustrating exemplary steps for the source system delivering enhanced content to each of the provider systems from a single source (i.e., the source system) employing a frequent delta updates delivery method, according to an embodiment of the present invention.

According to an embodiment of the present invention, the periodic feed files delivery method may be augmented with the frequent delta updates delivery method. FIG. 13 is a process flow diagram 1300 illustrating exemplary steps for the source system 32 delivering enhanced content to each of the provider systems 34a-34n from a single source (i.e., the source system 32) employing a frequent delta updates delivery method, according to an embodiment of the present invention. In this method, in step 1302, the source system 32 keeps track of all merchant listing records that are recorded either for the first time or for which the merchant has provided updated information. In step 1304, at regular intervals, (e.g., every five minutes) the provider system 34a contacts the source system 32 for an update. In step 1306, the source system 32 delivers all of the updated listing information from the time since the last contact. In step 1308, the provider system 34a processes this information by updating its own listing records in the provider database 44a based on the listing information supplied in the delta update. In Step 1310, when the provider system 34a receives a request from the consumer 46 from a consumer Web browser 120 to provide listing information for any such listings to the consumer 46, then in Step 1312, the provider system 34a provides the up-to-date information to the consumer 46 in a consumer Web browser 120.

Figure 14:
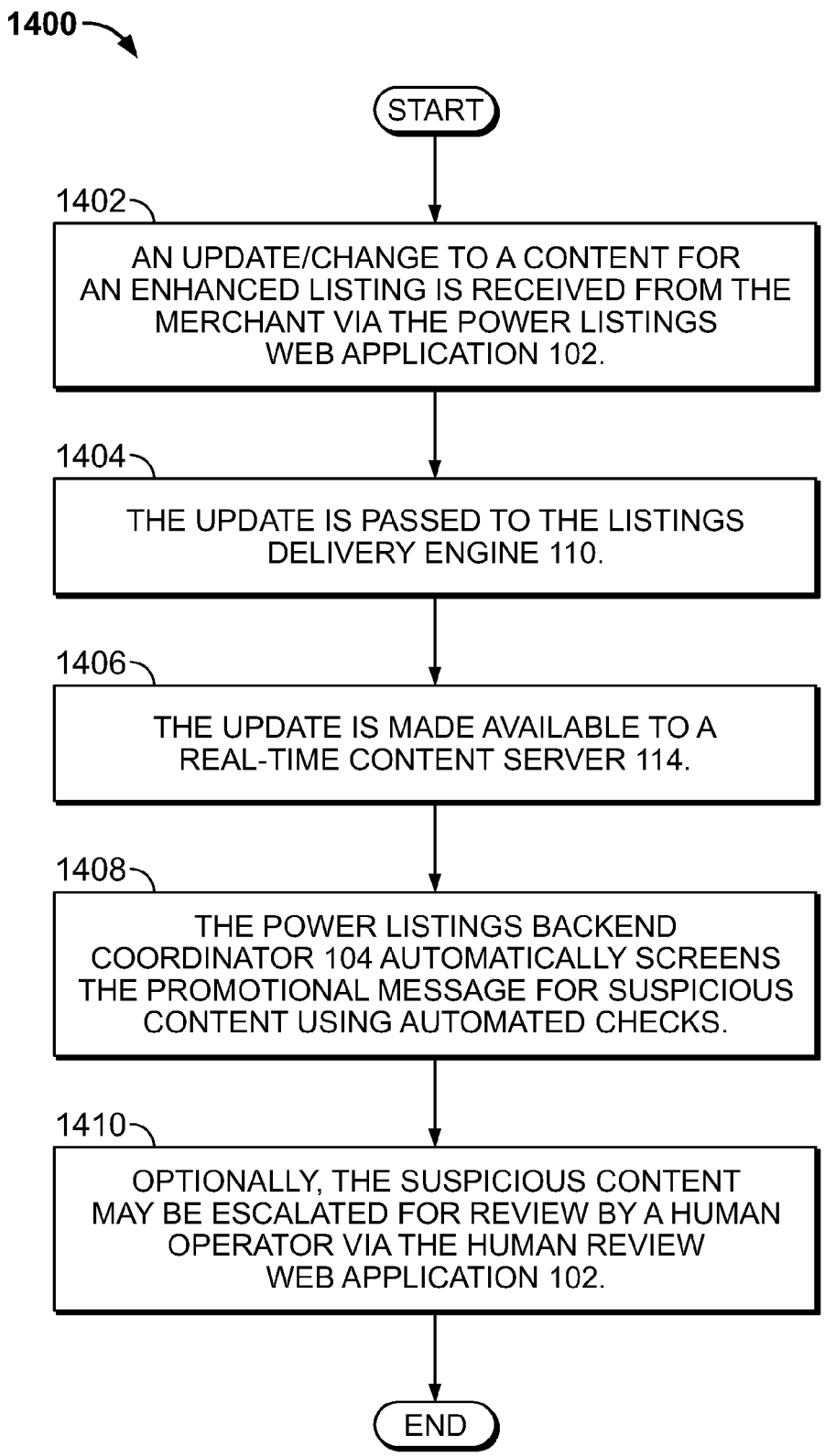
FIG. 14 is a process flow diagram illustrating exemplary steps for updating enhanced content on each of the provider systems at the request of the merchant, according to an embodiment of the present invention.
Figure 15:
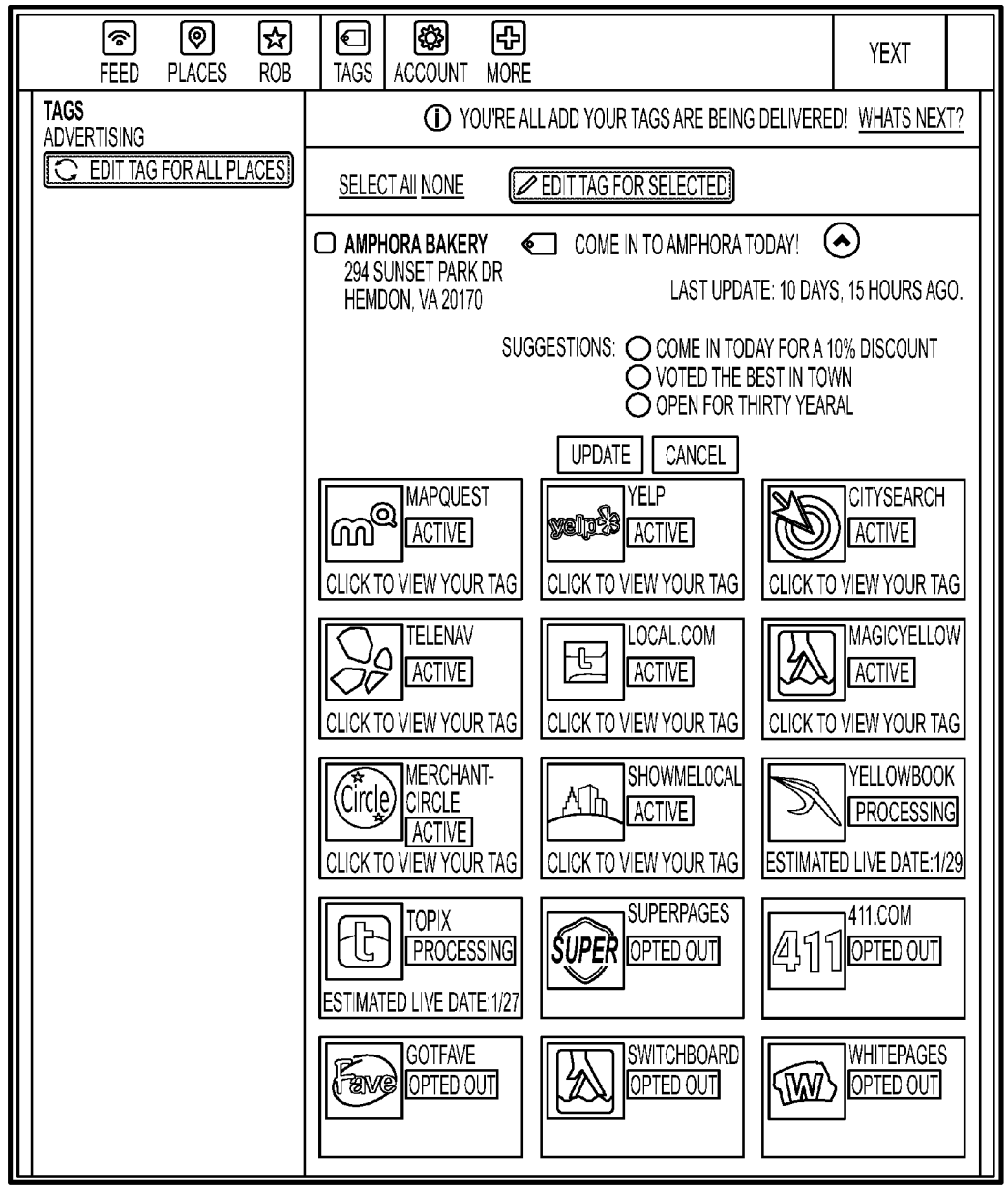
FIG. 15 is an exemplary screen shot of an input screen for updating enhanced content (e.g., a promotional tagline)

FIG. 14 is a process flow diagram 1400 illustrating exemplary steps for the source system 32 updating content associated with enhanced listings on each of the provider systems 34a-34n at the request of the merchant 38, according to an embodiment of the present invention. In Step 1402, the merchant 38 may update/change any content associated with enhanced listings, such as a promotional message or URL associated with the promotional message, photos, business description, etc. via the PowerListings Web application 102 (See FIG. 15 for an example input screen for the promotional message), upon which, in Step 1404, the update is passed to the listings delivery engine 110. The updated promotional message may be included with the listing when next supplied to the provider systems 34a-34n as described above when employing either the periodic feed delivery method, or the real-time API request delivery method. In Step 1406, the update is made available to a real-time content server 114. In an embodiment, optionally in Step 1408, the PowerListings backend coordinator 104 may automatically screen the promotional message for suspicious content using automated checks, and, in Step 1410, may be escalated for review by a human operator 40 via the human review Web application 114.

Figure 16:
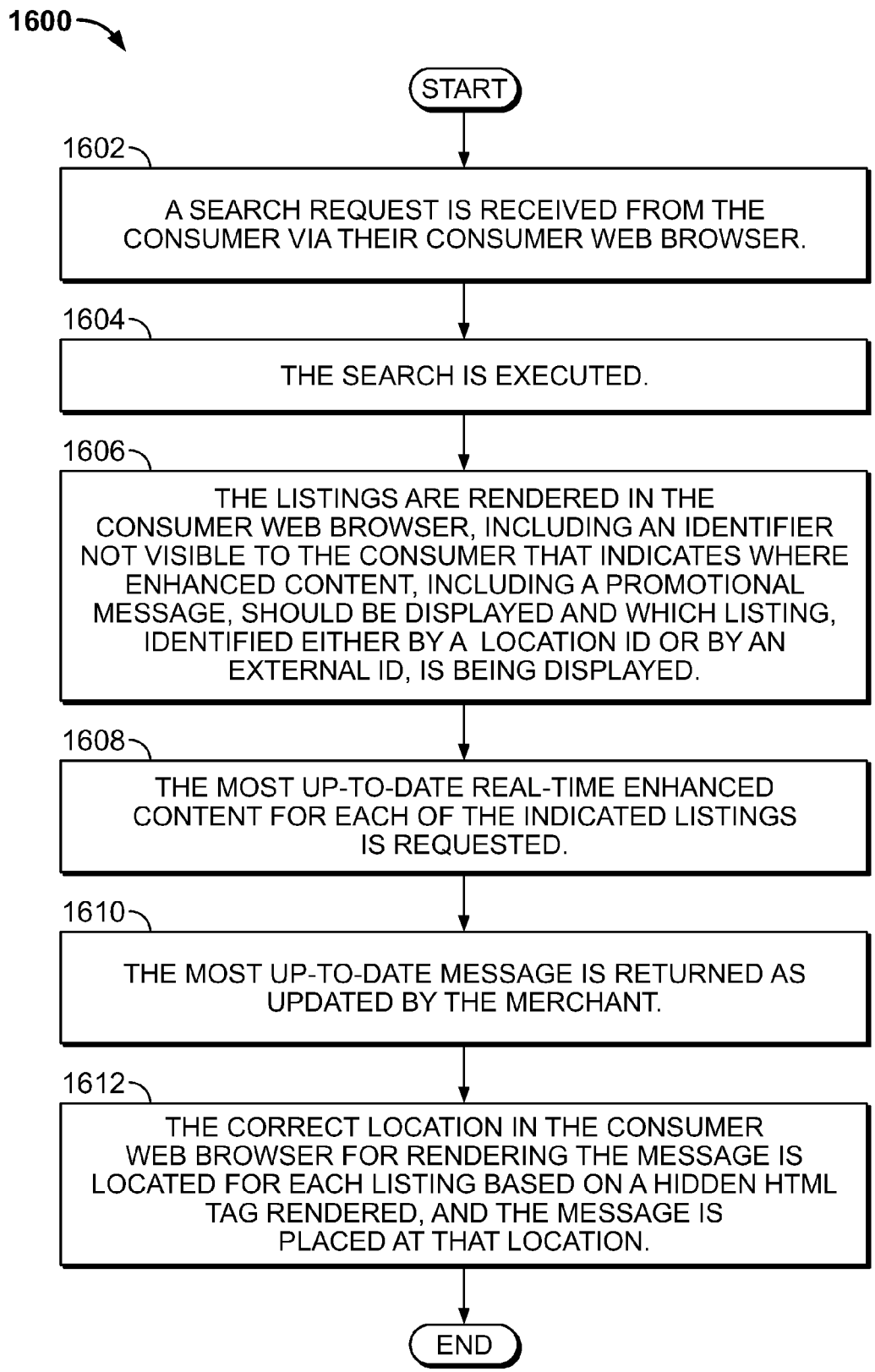
FIG. 16 is a process flow diagram illustrating exemplary steps for a provider system rendering listings in response to a search request by a consumer from a consumer Web browser, according to an embodiment of the present invention.
Figure 17A:
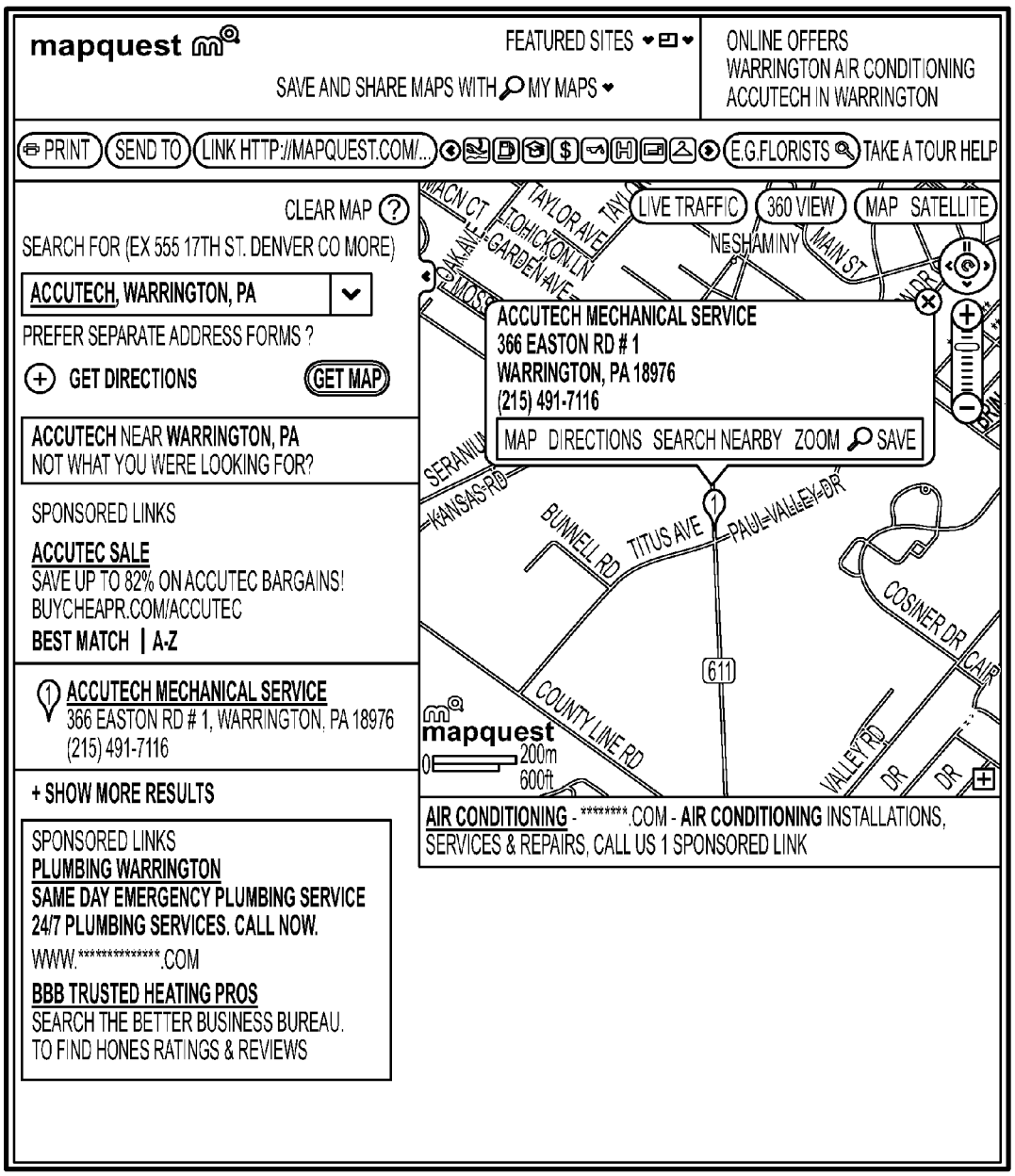
FIGS. 17A-17B are exemplary screen shots of search results displayed to the consumer without and with a real-time message, respectively.
Figure 17B:
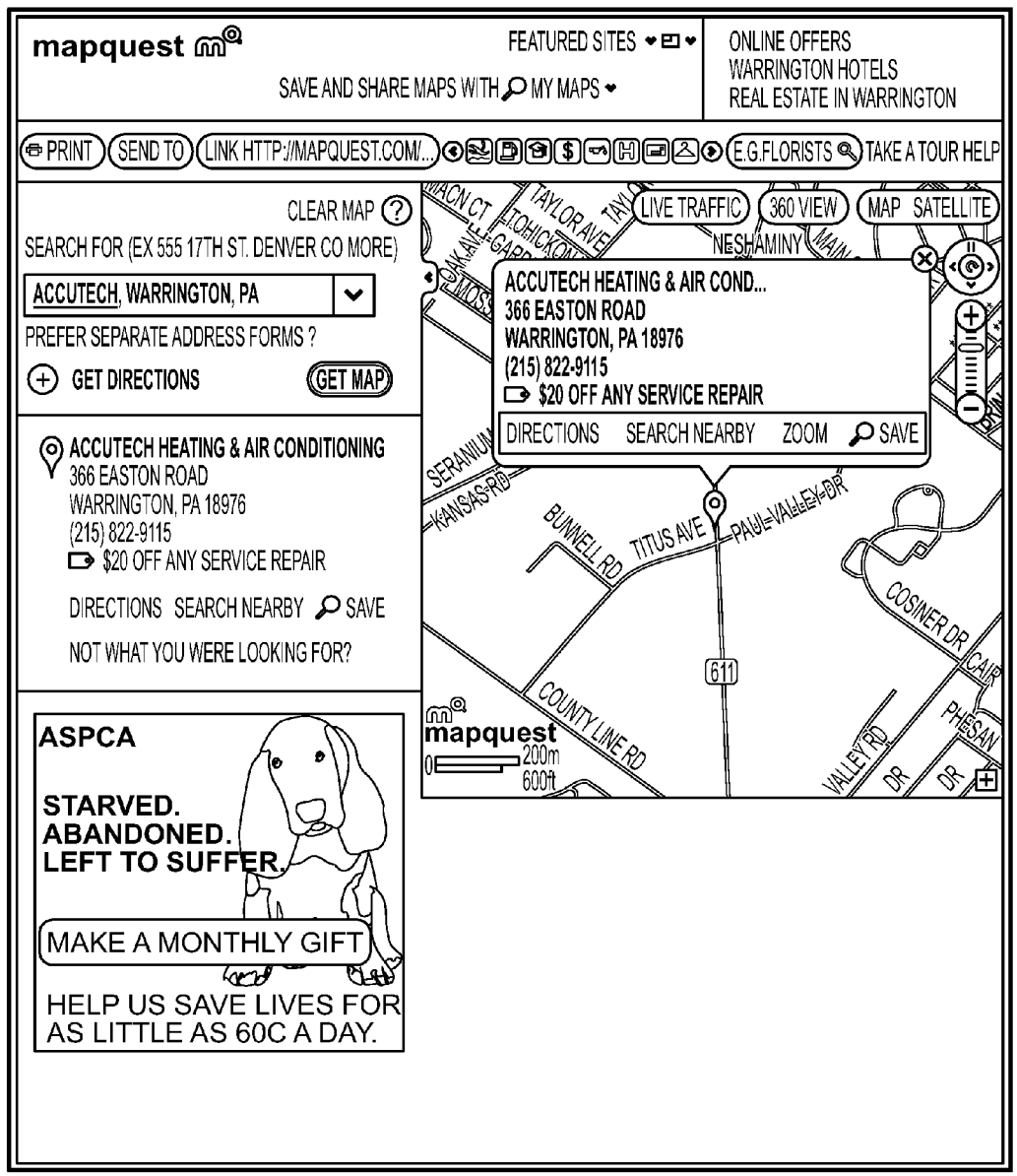

FIG. 16 is a process flow diagram 1600 illustrating exemplary steps for a provider system 34a-34n rendering listings in response to a search request by a consumer 46 from a consumer Web browser 120, according to an embodiment of the present invention. FIGS. 17A-17B are exemplary screen shots of search results displayed to the consumer 46. In Step 1602, the provider directory site 116 receives a search request from the consumer 46 via their consumer Web browser 120. In response to the search request, in Step 1404, the provider directory site 116 executes the search by means known in the art. When results are returned, in Step 1606, the provider directory site 116 renders the search results in the consumer Web browser 120 in such a way as to (i) include a promotional highlight, (ii) include an area in the Web page on the consumer Web browser 120 in which a real-time message and other content included in an enhanced listing may be displayed, and (iii) include a special identifier, not visible to the consumer 46, indicating where the real-time message and other enhanced content should be displayed and which listing, identified either by a source system Listing ID or by an External ID, is being displayed. The consumer Web browser 120 may be further rendered to include a PowerListings JavaScript 118, customized to contain a non-consumer visible list of all listings on the rendered Web page that are enhanced listings and should therefore include real-time content from the source system, indicated as a comma-separated list of Location IDs or External IDs (See FIG. 18).

Referring now to FIGS. 16 and 17A-17B, the consumer Web browser 120 initially displays the listing as served by the provider system 34a-34n, without real-time content, such as a promotional message. In Step 1608, the PowerListings JavaScript 118 requests the most up-to-date real-time content, such as a real-time promotional message, for each of the indicated listings from the real-time content server 114. In Step 1410, the real-time content server 114 returns the most up-to-date message (as updated by the merchant 38). In Step 1412, the PowerListings JavaScript 118 locates the correct location in the consumer Web browser 120 for rendering the message for each listing based on the hidden HTML tag rendered in Step 1606, and places the message at that location. As a result, the most up-to-date real-time content is always displayed.

According to certain embodiments of the present invention, the steps of the source system 32 updating enhanced listings on each of the provider systems 34a-34n at the request of the merchant 38 of FIG. 14 and rendering listings in response to a search request on the consumer Web browser 120 of FIG. 16 are subject to numerous variations. For instance, rather than rendering a blank area for the real-time message, the provider directory site 116 may render the most recent message supplied via the periodic feed files delivery method to the provider periodic feed receiver 112, which is then replaced with a JavaScript. Rather than including PowerListings JavaScript 118, the provider system 34a-34n may include a custom-written JavaScript that makes calls directly to the real-time content server 114. A provider supplied JavaScript may be preferable when the provider system 34a-34n has a JavaScript included in its own applications and it is desirable for the provider system 34a-34n to integrate the call to the real-time content server 114 within the existing logic of the provider system 34a-34n.

According to an embodiment of the present invention, the JavaScript mechanism for real-time content updates described above can be used by provider systems either when displaying search results, which may include one or more enhanced listings mixed with regular listings (which may include less information concerning each) or when displaying a page with detailed information for a single enhanced listing. In the latter case, the information that is pulled from the real-time content server 110 may include an extensive set of the content fields associated with the enhanced listing, so that all or nearly all of the information supplied with the enhanced listing is served directly from the source system's real-time content server 110 without being processed by the provider system directly.

According to an embodiment of the present invention, rather than passing a JavaScript to a consumer Web browser 120, the provider directory site 116 may request the most up-to-date enhanced content for each enhanced listing in server-to-server communication with the real-time content server 114 on demand, and then may render the enhanced content, including the promotional message or "tag line," as static text in the consumer Web browser 120. As used herein, a tag line refers to a real-time promotional message associated with a listing. (Although other information associated with the listing may be supplied through the real-time mechanism as well, the tag line, i.e. promotional message, is the one that is most time-sensitive because it often contains promotional deals, e.g., "$20 off a refrigerator today only!").

According to an embodiment of the present invention, if the listings are not rendered in a consumer Web browser 120, but via a mobile application, navigation application, etc., the device hosting the application may not be operable to employ JavaScript. In such circumstances, the provider directory site 116 may request the most up-to-date listings content for listings on demand via the real-time content server 114 before serving the listings to the consumer 46 via the application.

According to an embodiment of the present invention, the listings delivery engine 110 may pass real-time content updates to real-time provider listing update APIs 150 rather than via the provider periodic feed receiver 112 executing in the provider system 34a-34n for the purpose of receiving real-time content updates.

Figure 19:
FIG. 19 is a screen shot of exemplary enhanced features that may be provided to the consumer, according to an embodiment of the present invention.

FIG. 19 is a screen shot 1900 of exemplary enhanced features that may be provided to the consumer 46, according to an embodiment of the present invention. On a regular basis, the merchant 38 may supply enhanced listing content about their business via the PowerListings Web application 102. Enhanced information may include, but is not limited to: a description of the business 1902, a list of services the business provides 1904, photographs and other images 1906, a video (not shown), a map location 1908, business hours 1910, a promotional listing (e.g., a coupon) 1912, inventory information (not shown), etc. This enhanced information is provided with business listings via enhanced listing data retrieved from the central database 42 by the listings delivery engine 110 and passed to the provider periodic feed receiver 112, provider listing update API 150, served via the real-time JavaScript mechanism from the real-time content server 110, or by some combination of these mechanisms. The enhanced information may be included by the provider system 34a-34n on the provider directory site 116 when a consumer 46 requests detailed information about a particular merchant.

According to an embodiment of the present invention, when the merchant 38 changes listing information data, e.g., the name, address, or phone number of a listing, the change is updated via the PowerListings Web application 102. The update is passed from the tags Web application 102 via the listings delivery engine 110 to the provider periodic feed receiver 112 or the provider listing update API 150. Because the listing includes an External ID, the provider periodic feed receiver 112 or provider listing update API 150 interprets the new information as an update to an existing listing rather than a new listing, and updates the listing in the provider database 44a-44n. In this way, the merchant 38 may maintain their listing information from a single location (i.e., the PowerListings Web application 102 of the source system 32).

Figure 20:
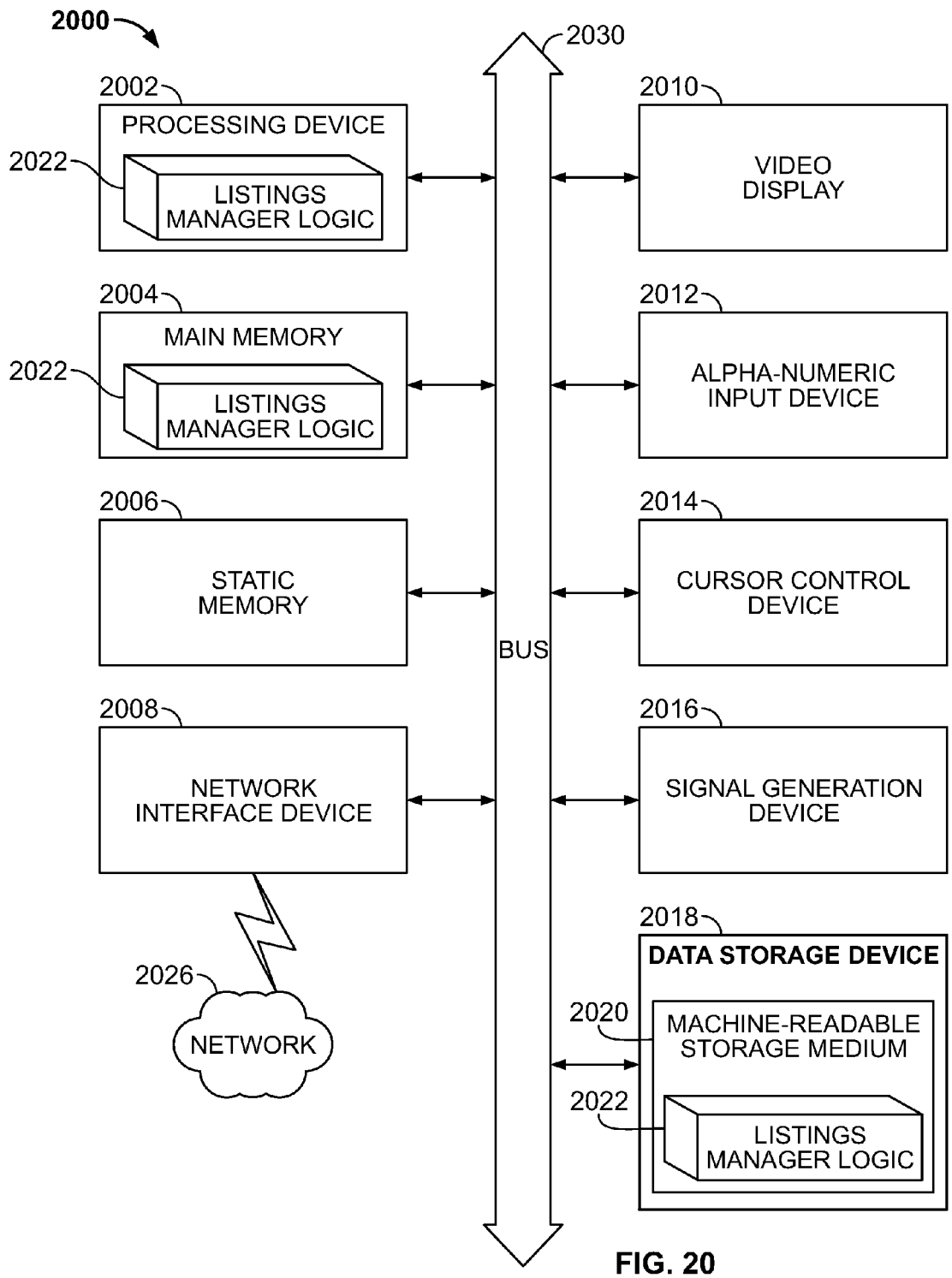
FIG. 20 illustrates a diagrammatic representation of a machine in the exemplary form of a computer system within which a set of instructions, for causing the machine to perform any one or more of the methodologies discussed herein, may be executed.

FIG. 20 illustrates a diagrammatic representation of a machine in the exemplary form of a computer system 2000 within which a set of instructions, for causing the machine to perform any one or more of the methodologies discussed herein, may be executed. In alternative embodiments, the machine may be connected (e.g., networked) to other machines in a local area network (LAN), an intranet, an extranet, or the Internet. The machine may operate in the capacity of a server or a client machine in a client-server network environment, or as a peer machine in a peer-to-peer (or distributed) network environment. The machine may be a personal computer (PC), a tablet PC, a set-top box (STB), a personal digital assistant (PDA), a cellular telephone, a web appliance, a server, a network router, switch or bridge, or any machine capable of executing a set of instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein.

The exemplary computer system 2000 includes a processing device 2002, a main memory 2004 (e.g., read-only memory (ROM), flash memory, dynamic random access memory (DRAM) (such as synchronous DRAM (SDRAM) or Rambus DRAM (RDRAM), etc.), a static memory 2006 (e.g., flash memory, static random access memory (SRAM), etc.), and a data storage device 2018, which communicate with each other via a bus 2030.

Processing device 2002 represents one or more general-purpose processing devices such as a microprocessor, central processing unit, or the like. More particularly, the processing device may be complex instruction set computing (CISC) microprocessor, reduced instruction set computer (RISC) microprocessor, very long instruction word (VLIW) microprocessor, or processor implementing other instruction sets, or processors implementing a combination of instruction sets. Processing device 2002 may also be one or more special-purpose processing devices such as an application specific integrated circuit (ASIC), a field programmable gate array (FPGA), a digital signal processor (DSP), network processor, or the like. Processing device 2002 is configured to execute device queue manager logic 2022 for performing the operations and steps discussed herein.

Computer system 2000 may further include a network interface device 408. Computer system 2000 also may include a video display unit 2010 (e.g., a liquid crystal display (LCD) or a cathode ray tube (CRT)), an alphanumeric input device 2012 (e.g., a keyboard), a cursor control device 2014 (e.g., a mouse), and a signal generation device 2016 (e.g., a speaker).

Data storage device 2018 may include a machine-readable storage medium (or more specifically a computer-readable storage medium) 2020 having one or more sets of instructions (e.g., listing manager logic 2022) embodying any one or more of the methodologies of functions described herein. Listings manager logic 2022 may also reside, completely or at least partially, within main memory 2004 and/or within processing device 2002 during execution thereof by computer system 2000; main memory 2004 and processing device 2002 also constituting machine-readable storage media. Listings manager logic 2022 may further be transmitted or received over a network 2026 via network interface device 2008.

Machine-readable storage medium 2020 may also be used to store the device queue manager logic persistently. While machine-readable storage medium 2020 is shown in an exemplary embodiment to be a single medium, the term "machine-readable storage medium" should be taken to include a single medium or multiple media (e.g., a centralized or distributed database, and/or associated caches and servers) that store the one or more sets of instructions. The term "machine-readable storage medium" shall also be taken to include any medium that is capable of storing or encoding a set of instruction for execution by the machine and that causes the machine to perform any one or more of the methodologies of the present invention. The term "machine-readable storage medium" shall accordingly be taken to include, but not be limited to, solid-state memories, and optical and magnetic media.

The components and other features described herein can be implemented as discrete hardware components or integrated in the functionality of hardware components such as ASICs, FPGAs, DSPs or similar devices. In addition, these components can be implemented as firmware or functional circuitry within hardware devices. Further, these components can be implemented in any combination of hardware devices and software components.

Some portions of the detailed descriptions are presented in terms of algorithms and symbolic representations of operations on data bits within a computer memory. These algorithmic descriptions and representations are the means used by those skilled in the data processing arts to most effectively convey the substance of their work to others skilled in the art. An algorithm is here, and generally, conceived to be a self-consistent sequence of steps leading to a desired result. The steps are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise, as apparent from the above discussion, it is appreciated that throughout the description, discussions utilizing terms such as "enabling", "transmitting", "requesting", "identifying", "querying", "retrieving", "forwarding", "determining", "passing", "processing", "disabling", or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

Embodiments of the present invention also relate to an apparatus for performing the operations herein. This apparatus may be specially constructed for the required purposes or it may comprise a general purpose computer selectively activated or reconfigured by a computer program stored in the computer. Such a computer program may be stored in a computer readable storage medium, such as, but not limited to, any type of disk including floppy disks, optical disks, CD-ROMs and magnetic-optical disks, read-only memories (ROMs), random access memories (RAMs), EPROMs, EEPROMs, magnetic or optical cards, flash memory devices including universal serial bus (USB) storage devices (e.g., USB key devices) or any type of media suitable for storing electronic instructions, each of which may be coupled to a computer system bus.

The algorithms and displays presented herein are not inherently related to any particular computer or other apparatus. Various general purpose systems may be used with programs in accordance with the teachings herein or it may prove convenient to construct more specialized apparatus to perform the required method steps. The required structure for a variety of these systems will be apparent from the description above. In addition, the present invention is not described with reference to any particular programming language. It will be appreciated that a variety of programming languages may be used to implement the teachings of the invention as described herein.

The present invention has several advantages over prior art business listings and local search engines/systems. For example, existing search service providers provide a daily, weekly, monthly, or quarterly feed for updating listings of local merchant data, which may be the only way of updating content. Existing listings services rely on the recipient of the listing information (provider systems) to attempt any matching of their own listings (e.g., some provider systems accept only an advertised listing from a single source. As a result, there may be duplicate listing of the same merchant with no attempt by the provider systems to remove the duplicate entries). As of this writing, search service providers do not perform matching from a central server system 32 and do not provide each provider system 34a-34n with its ID for a listing. Still further, there are no known instances of service providers providing a combination of accepting data in a periodic feed, serving content with special markers based on this data, and having this data augmented with a JavaScript-based call back to the original central server system 32, which solves an apparent latency problem for updating content in a number of domains. There are also no known instances of a service provider accepting listing information from a merchant and delivering it to multiple provider systems via a real-time API. There are also no known instances of a service provider accepting listing information from a merchant and then distributing it to multiple providers using a combination of these mechanisms based on the capabilities of each provider system in order to minimize the latency of distribution new listing information as far as possible. There are also no known instances of such a listings service using automated mechanisms to ascertain whether the listings sent out to provider systems are correctly added and correctly updated.

A merchant is provided with the most up-to-date information possible associated with their business listings. Provider systems each have different capabilities and mechanisms for the support of the adding and updating of merchant listings. Some of them have systems that can operate only on a daily or multi-day cycle through the use of "feed" files that contain listing information and are processed daily. Others are able to process "feed" files more frequently, and still others have assorted miscellaneous mechanisms allowing for faster updates. Methods and systems according to certain embodiments of the present invention provide a way to make use of each of the existing mechanisms available with each provider system in the most efficient manner possible to effect updates to listings in a manner as near to real-time as possible. Provider systems that can process "feed" updates only infrequently to nevertheless display certain elements of the enhanced content-in real time or near real-time. Embodiments of the present invention provide a means for those provider systems with proper technical capacity to implement a mechanism through which, from a single source system, all content on any provider listings can be updated in real time or near real-time.

It is to be understood that the above description is intended to be illustrative, and not restrictive. Many other embodiments will be apparent to those of skill in the art upon reading and understanding the above description. Although the present invention has been described with reference to specific exemplary embodiments, it will be recognized that the invention is not limited to the embodiments described, but can be practiced with modification and alteration within the spirit and scope of the appended claims. Accordingly, the specification and drawings are to be regarded in an illustrative sense rather than a restrictive sense. The scope of the invention should, therefore, be determined with reference to the appended claims, along with the full scope of equivalents to which such claims are entitled.

What is claimed is:

1. A computer-implemented method comprising:
   receiving, by a source system, listing identification data related to an entity;
   transmitting listing identification data from the source system to at least one provider system distinct from the source system;
   receiving a potential matching listing from the at least one provider system;
   verifying whether the potential matching listing is a valid listing or a non-valid listing, wherein the valid listing or the non-valid listing comprises an indication of the presence or absence of a provider-supplied external identifier; and
   when the potential matching listing is the valid listing,
   delivering an enhanced listing to the at least one provider system based on the presence or absence of the provider-supplied external identifier in the valid listing, by, at periodic intervals, generating a feed file for each provider system including associated target listings that are to become enhanced listings and transmitting each feed file to a corresponding provider system,
   wherein when the provider-supplied external identifier is present in the valid listing, the enhanced listing is to include the provider-supplied external identifier,
   wherein the presence of the provider-supplied external identifier in the enhanced listing is an indication to the at least one provider system to update a listing in the provider system based on the enhanced listing and
   wherein when the provider-supplied external identifier is absent in the valid listing, the enhanced listing is not to include the provider-supplied external identifier,
   wherein the absence of the provider-supplied external identifier in the enhanced listing is an indication to the at least one provider system to create a listing in the provider system based on the enhanced listing.

2. The computer-implemented method of claim 1, further comprising:
   attempting to match the potential matching listing to the listing identification data based on a measure of certainty,
   wherein when the measure of certainty is above or equal to a predetermined threshold, the potential matching listing is designated as the valid listing and is associated with the provider-supplied external identifier and with a first indication that the valid listing is ready to be delivered and
   when the measure of certainty is below the predetermined threshold, the potential matching listing is designated as a non-valid listing and is associated with a second indication that the non-valid listing is to be delivered as a new listing; and
   delivering the enhanced listing to the at least one provider system based on the first indication or the second indication.

3. The computer-implemented method of claim 1, wherein the feed file for each provider system includes at least network access point information and enhanced content, wherein, when the provider-supplied external identifier is not present, the corresponding provider system is configured to create a new listing based on the enhanced content.

4. The computer-implemented method of claim 1, wherein delivering the enhanced listing to the at least one provider system further comprises:
   transmitting a JavaScript configured for display in a consumer web browser;
   receiving an external identifier from a provider system communicatively connected to the web browser; and
   returning up-to-date enhanced content to the web browser based on an enhanced listing associated with the external identifier.

5. The computer-implemented method of claim 1, further comprising, at regular intervals:
   receiving a request for a delta update from the at least one provider system;
   delivering updated listing information from the time since a last request; and
   updating listing records in the source system based on the listing information supplied in the delta update.

6. The computer-implemented method of claim 1, wherein delivering the enhanced listing to the at least one provider system further comprises employing a real-time application programming interface associated with a corresponding one of the at least one provider system.

7. The computer-implemented method of claim 6, further comprising:
   contacting the at least one provider system through a corresponding application programming interface;
   providing listing information, including a network access point and enhanced content via the corresponding application programming interface;
   receiving an external identifier corresponding to the listing information located on the at least one provider system and a uniform resource locator where a consumer can expect to see a corresponding listing on the at least one provider system; and
   when the listing information is provided for the first time, receiving an indication that the corresponding listing is now in service on the at least one provider system.

8. The computer-implemented method of claim 1, further comprising:
   presenting the received listing from the at least one provider system to a user;
   receiving an indication from the user that the received listing from at least one provider system is a match; and
   recording an indication in a source system database that the received listing is ready to be delivered.

9. The computer-implemented method of claim 1, further comprising:
   presenting the received listing from the at least one provider system to a user;
   receiving an indication from the user that the received listing is incorrect or no probable match is found;
   receiving a search query by the user for a match on the at least one provider system; and
   returning an indication from the user that the listing data corresponding to the search query is a match or an indication from the user that no data matching the query exists on the at least one provider system,
   wherein, when a match is found, the received listing is associated with a provider-supplied external identifier and with an indication that the listing is ready to be delivered and
   when a match is not found, the received listing is associated with an indication that the received listing should be delivered as a new listing.

10. The computer-implemented method of claim 9, further comprising:
    receiving an indication of acceptance of the search query or receiving a second search query from the human operator on the at least one provider system,
    wherein when the human operator indicates that a match is found, the received listing is associated with a provider-supplied external identifier and returned with an indication that the received listing is ready to be delivered and
    when the human operator indicates that a match is found, the received listing is associated with an indication that the received listing should be delivered as a new listing.

11. The computer-implemented method of claim 1, further comprising:
    receiving a receipt file containing a list of all listings with listing information controlled and updated by the source system from each of the at least one provider system.

12. The computer-implemented method of claim 11, wherein the receipt file includes, for each listing, a source system-assigned listing identifier, a provider-supplied external identifier, and a uniform resource locator where the consumer can expect to see the listing on a corresponding provider system, and for any listings appearing for the first time, an indication that the listing is now in service on the corresponding provider system.

13. A computer system, comprising:
    a memory;
    a processing device, coupled to the memory and configured to:
      receive, by a source system, listing identification data related to an entity;
      transmit listing identification data from the source system to at least one provider system distinct from the source system;
      receive a potential matching listing from the at least one provider system;
      verify whether the potential matching listing is a valid listing or a non-valid listing, wherein the valid listing or the non-valid listing comprises an indication of the presence or absence of a provider-supplied external identifier; and
      when the potential matching listing is the valid listing, delivering an enhanced listing to the at least one provider system based on the presence or absence of the provider-supplied external identifier in the valid listing, by, at periodic intervals, generating a feed file for each provider system including associated target listings that are to become enhanced listings and transmitting each feed file to a corresponding provider system,
    wherein when the provider-supplied external identifier is present in the valid listing, the enhanced listing is to include the provider-supplied external identifier,
    wherein the presence of the provider-supplied external identifier in the enhanced listing is an indication to the at least one provider system to update a listing in the provider system based on the enhanced listing and
    wherein when the provider-supplied external identifier is absent in the valid listing, the enhanced listing is not to include the provider-supplied external identifier,
    wherein the absence of the provider-supplied external identifier in the enhanced listing is an indication to the at least one provider system to create a listing in the provider system based on the enhanced listing.

14. The computer system of claim 13, wherein the processing device is further configured to:
    attempt to match the potential matching listing to the listing identification data based on a measure of certainty, wherein when the measure of certainty is above or equal to a predetermined threshold, the potential matching listing is designated as the valid listing and is associated with the provider-supplied external identifier and with a first indication that the valid listing is ready to be delivered and when the measure of certainty is below the predetermined threshold, the potential matching listing is designated as non-valid listing and is associated with a second indication that the non-valid listing is to be delivered as a new listing; and deliver the enhanced listing to the at least one provider system based on the first indication or the second indication.

15. The computer system of claim 13, wherein the processing device is further configured to:

receive a receipt file containing a list of all listings with listing information controlled and updated by the source system from each of the at least one provider system.

16. The computer system of claim 15, wherein the receipt file includes, for each listing, a source system-assigned listing identifier, a provider-supplied external identifier, and a uniform resource locator where the consumer can expect to see the listing on the corresponding provider system, and for any listings appearing for the first time, an indication that the listing is now in service on the corresponding provider system.

17. A non-transitory computer readable storage medium including instructions that, when executed by a processing system, cause the processing system to perform operations comprising:

receiving, by a source system, listing identification data related to an entity;

transmitting listing identification data from the source system to at least one provider system distinct from the source system;

receiving a potential matching listing from the at least one provider system;

verifying whether the potential matching listing is a valid listing or a non-valid listing, wherein the valid listing or the non-valid listing comprises an indication of the presence or absence of a provider-supplied external identifier; and when the potential matching listing is the valid listing, delivering an enhanced listing to the at least one provider system based on the presence or absence of the provider-supplied external identifier in the valid listing, by, at periodic intervals, generating a feed file for each provider system including associated target listings that are to become enhanced listings and transmitting each feed file to a corresponding provider system, wherein when the provider-supplied external identifier is present in the valid listing, the enhanced listing is to include the provider-supplied external identifier, wherein the presence of the provider-supplied external identifier in the enhanced listing is an indication to the at least one provider system to update a listing in the provider system based on the enhanced listing and wherein when the provider-supplied external identifier is absent in the valid listing, the enhanced listing is not to include the provider-supplied external identifier, wherein the absence of the provider-supplied external identifier in the enhanced listing is an indication to the at least one provider system to create a listing in the provider system based on the enhanced listing.

18. The non-transitory computer readable storage medium of claim 17, further comprising:

attempting to match the potential matching listing to the listing identification data based on a measure of certainty, wherein when the measure of certainty is above or equal to a predetermined threshold, the potential matching listing is designated as the valid listing and is associated with the provider-supplied external identifier and with a first indication that the valid listing is ready to be delivered and when the measure of certainty is below the predetermined threshold, the potential matching listing is designated as a non-valid listing and is associated with a second indication that the non-valid listing is to be delivered as a new listing; and delivering the enhanced listing to the at least one provider system based on the first indication or the second indication.

19. The non-transitory computer readable storage medium of claim 17, further comprising:

receiving a receipt file containing a list of all listings with listing information controlled and updated by the source system from each of the at least one provider system.

20. The non-transitory computer readable storage medium of claim 19, wherein the receipt file includes, for each listing, a source system-assigned listing identifier, a provider-supplied external identifier, and a uniform resource locator where the consumer can expect to see the listing on the corresponding provider system, and for any listings appearing for the first time, an indication that the listing is now in service on the corresponding provider system.

21. A computer-implemented method, comprising:

receiving, at a source system, listing identification data related to an entity;

transmitting listing identification data from the source system to at least one provider system distinct from the source system;

receiving a potential matching listing from the at least one provider system;

verifying whether the potential matching listing is a valid listing or a non-valid listing, wherein the valid listing or the non-valid listing comprises an indication of the presence or absence of a provider-supplied external identifier; and when the potential matching listing is the valid listing, delivering an enhanced listing to the at least one provider system based on the presence or absence of the provider-supplied external identifier in the valid listing, by employing a real-time application programming interface associated with a corresponding one of the at least one provider system, wherein when the provider-supplied external identifier is present in the valid listing, the enhanced listing is to include the provider-supplied external identifier, wherein the presence of the provider-supplied external identifier in the enhanced listing is an indication to the at least one provider system to update a listing in the provider system based on the enhanced listing and wherein when the provider-supplied external identifier is absent in the valid listing, the enhanced listing is not to include the provider-supplied external identifier, wherein the absence of the provider-supplied external identifier in the enhanced listing is an indication to the at least one provider system to create a listing in the provider system based on the enhanced listing, and wherein employing a real-time application programming interface comprises:

contacting the at least one provider system through a corresponding application programming interface;

providing listing information, including a network access point and enhanced content via the corresponding application programming interface;

receiving an external identifier corresponding to the listing information located on the at least one provider system and a uniform resource locator where a consumer can expect to see a corresponding listing on the at least one provider system; and when the listing information is provided for the first time, receiving an indication that the corresponding listing is now in service on the at least one provider system.

* * * * *